(12) United States Patent
Bai et al.

(10) Patent No.: US 9,015,689 B2
(45) Date of Patent: Apr. 21, 2015

(54) STACK DATA MANAGEMENT FOR SOFTWARE MANAGED MULTI-CORE PROCESSORS

(71) Applicants: Ke Bai, Tempe, AZ (US); Aviral Shrivastava, Chandler, AZ (US); Jing Lu, Tempe, AZ (US)

(72) Inventors: Ke Bai, Tempe, AZ (US); Aviral Shrivastava, Chandler, AZ (US); Jing Lu, Tempe, AZ (US)

(73) Assignee: Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 14/200,477

(22) Filed: Mar. 7, 2014

(65) Prior Publication Data

US 2014/0282454 A1   Sep. 18, 2014

Related U.S. Application Data

(60) Provisional application No. 61/781,642, filed on Mar. 14, 2013.

(51) Int. Cl.
*G06F 9/45* (2006.01)
*G06F 9/38* (2006.01)
*G06F 9/50* (2006.01)

(52) U.S. Cl.
CPC .............. *G06F 8/433* (2013.01); *G06F 8/4442* (2013.01); *G06F 9/38* (2013.01); *G06F 9/50* (2013.01)

(58) Field of Classification Search
CPC ..................................................... G06F 8/433
USPC ........................................................ 717/157
See application file for complete search history.

(56) References Cited

U.S. PATENT DOCUMENTS

| | | | |
|---|---|---|---|
| 6,434,743 B1 * | 8/2002 | Click et al. ..................... | 717/157 |
| 6,799,253 B1 | 9/2004 | Peterson | |
| 6,876,561 B2 | 4/2005 | Wolrich et al. | |
| 7,367,024 B2 | 4/2008 | Barua et al. | |
| 7,558,935 B1 * | 7/2009 | Boucher et al. ............... | 711/170 |
| 7,996,630 B2 | 8/2011 | Yim et al. | |
| 8,595,702 B2 * | 11/2013 | Maybee et al. ............... | 717/125 |
| 2007/0256059 A1 * | 11/2007 | Sullivan et al. ............... | 717/139 |
| 2010/0223429 A1 * | 9/2010 | Cher et al. ..................... | 711/122 |

(Continued)

FOREIGN PATENT DOCUMENTS

WO     2010/142432     6/2010

OTHER PUBLICATIONS

Hyungmin Cho et al., "Dynamic Data Scratchpad Memory Management for a Memory Subsystem with an MMU", ACM, Jun. 13-15, 2007, pp. 195-206.*

(Continued)

*Primary Examiner* — Wei Zhen
*Assistant Examiner* — Lanny Ung
(74) *Attorney, Agent, or Firm* — Norton Rose Fulbright US LLP

(57) ABSTRACT

Methods and apparatus for managing stack data in multi-core processors having scratchpad memory or limited local memory. In one embodiment, stack data management calls are inserted into software in accordance with an integer linear programming formulation and a smart stack data management heuristic. In another embodiment, stack management and pointer management functions are inserted before and after function calls and pointer references, respectively. The calls may be inserted in an automated fashion by a compiler utilizing an optimized stack data management runtime library.

16 Claims, 14 Drawing Sheets

(56) References Cited

U.S. PATENT DOCUMENTS

2012/0137075 A1    5/2012    Vorbach
2012/0222005 A1    8/2012    Harris et al.

OTHER PUBLICATIONS

Sumesh Udayakumaran et al., "Compiler-Decided Dynamic Memory Allocation for Scratch-Pad Based Embedded Systems", ACM, Nov. 1, 2003, pp. 276-286.*
Bernhard Egger et al., Scratchpad Memory Management for Portable Systems with a Memory Management Unit, ACM, Oct. 22-25, 2006, pp. 321-330.*
Bai, K. et al., "Vector Class on Limited Local Memory (LLM) Multicore Processors", Proceedings of the 14th International Conference on Compilers, Architectures and Synthesis for Embedded Systems (CASES), Oct. 2011, pp. 215-224.
Bai, K. et al., "Stack Data Management for Limited Local Memory (LLM) Multi-core Processors", IEEE International Conference in Application-Specific Systems, Architectures and Processors (ASAP), Sep. 2011, pp. 231-234.
Bai, K. et al., "Heap Data Management for Limited Local Memory (LLM) Multi-core Processors", IEEE/ACM/IFIP International Conference on Hardware/Software Codesign and System Synthesis (CODES+ISSS), Oct. 2010, pp. 317-325.
Jung, S.C. et al., "Dynamic Code Mapping for Limited Local Memory Systems", 21st IEEE International Conference in Application-Specific Systems, Architectures and Processors (ASAP), Jul. 2010, pp. 13-20.
Bai, K. et al., "Automatic and Efficient Heap Data Management for Limited Local Memory Multicore Architectures", Proceedings of the Conference on Design, Automation and Test in Europe (Date 2013), Mar. 2013, pp. 593-598.
Lu, J. et al., "SSDM: Smart Stack Data Management for Software Managed Multicores (SMMs)", 50th ACM/EDAC/IEEE Design Automation Conference, May 2013, pp. 1-8.
Angiolini, F. et al., "A Post-Compiler Approach to Scratchpad Mapping of Code", In Compilers, architecture, and synthesis for embedded systems, pp. 259-267, New York, NY, USA, 2004. ACM Press.
Avissar, O. et al., "An Optimal Memory Allocation Scheme for Scratch-Pad-Based Embedded Systems", ACM Trans. on Embedded Computing Sys., 1(1):6-26, 2002.
Balart, J. et al., "A Novel Asynchronous Software Cache Implementation for the Cell-BE Processor", LCPC 2007, LNCS 5234, pp. 125-140, 2008.
Banakar, R. et al., "Scratchpad Memory : A Design Alternative for Cache On-chip memory in Embedded Systems",In CODES'02:Hardware/software codesign, pp. 73-78, New York, NY, USA, 2002. ACM Press.
Dominguez, A. et al., "Heap Data Allocation to Scratch-Pad Memory 1 in Embedded Systems", Embedded Computing, 1(4):521-540, 2005.
Egger, B. et al., "Scratchpad Memory Management for Portable Systems with a Memory Management Unit", In EMSOFT '06: Proceedings of the 6th ACM & IEEE International conference on Embedded software, pp. 321-330, New York, NY, USA, 2006. ACM.
Egger, B. et al., "A Dynamic Code Placement Technique for Scratchpad Memory Using Postpass Optimization", In CASES '06: Proceedings of the 2006 international conference on Compilers, architecture and synthesis for embedded systems, pp. 223-233, New York, NY, USA, 2006. ACM.
Eichenbereger, A.E. et al., "Using advanced compiler technology to exploit the performance of the Cell Broadband Engine architecture", IBM Syst. J., 45(1):59-84, 2006.
Flachs, B. et al., "The microarchitecture of the synergistic processor for a cell processor", IEEE Solid-state circuits, 41(1):33-70, 2006.
Francesco, P. et al., "An Integrated Hardware/Software Approach for Run-Time Scratchpad Management", n Proc. DAC, 2004, pp. 238-243.
Guthaus, M.R. et al., "MiBench: A free, commercially representative embedded benchmark suite", WWC-4: IEEE International Workshop on Workload Characterization, pp. 3-14, Dec. 2, 2001.
Janapsatya, A. et al., "A novel instruction scratchpad memory optimization method based on concomitance metric", In ASP-DAC '06: Proceedings of the 2006 conference on Asia South Pacific design automation, pp. 612-617, Piscataway, NJ, USA, 2006. IEEE Press.
Johns, C.R. et al., "Introduction to the Cell Broadband Engine Architecture", IBM J. Res. Dev., vol. 51, No. 5, pp. 503-519, 2007.
Kandemir, M. et al., "Compiler-Directed Scratch Pad Memory Hierarchy Design and Management", in DAC '02: Proceedings of the 39th annual Design Automation Conference. New York, NY, USA: ACM, 2002, pp. 628-633.
Kandemir, M. et al., "Exploiting Shared Scratch Pad Memory Space in Embedded Multiprocessor Systems", In DAC, pp. 219-224, 2002.
Kandemir, M. et al., "Dynamic Management of Scratch-Pad Memory Space", In DAC, pp. 690-695, 2001.
Kannan, A. et al., "A software solution for dynamic stack management on scratch pad memory", In ASP-DAC '09: Proceedings of the 2009 Conference on Asia and South Pacific Design Automation, pp. 612-617, Piscataway, NJ, USA, 2009. IEEE Press.
Kim, Y. et al., "Operation and Data Mapping for CGRAs with Multibank Memory" In LCTES'10, Apr. 13-15, 2010, Stockholm, Sweden., p. 17-25.
Kistler, M. et al., "Cell Multiprocessor Communication Network: Built for Speed", IEEE Micro, May-Jun. 2006.
Li, L. et a., "Compiler-Directed Scratchpad Memory Management via Graph Coloring", ACM Trans. Archit. Code Optim., vol. 6, No. 3, pp. 1-17, 2009.
Li, L. et al., "Memory Coloring: A Compiler Approach for Scratchpad Memory Management", In Proceedings of the 14th International Conference on Parallel Architectures and Compilation Techniques (PACT'05), pp. 329-338, Sep. 2005.
Mamidipaka, M. et al., "On-chip Stack based Memory Organization for Low Power Embedded Architectures", In Proc Date, pp. 1082-1087, 2003.
McIlroy, R. et al., "Efficient Dynamic Heap Allocation of Scratch-Pad Memory", In ISMM'08, pp. 31-40, 2008.
Muck, T. R. et al., "Run-time Scratch-pad Memory Management for Embedded Systems", In Proc. IECON 2011—37th Annual conference on IEEE Industrial Electronics Society, pp. 2833-2938, 2011.
Nguyen, N. et al., "Memory Allocation for Embedded Systems with a Compile-Time-Unknown Scratch-Pad Size", In CASES, pp. 115-125, 2005.
Pabalkar, A. et al., SDRM: Simultaneous Determination of Regions and Function-to-Region Mapping for Scratchpad Memories, In Int'l Conference on High Performance Computing (HiPC), Dec. 2008.
Panda, P.R. et al., "On-Chip vs. Off-Chip Memory: The Data Partitioning Problem in Embedded Processor-Based Systems", ACM Transactions on Design Automation of Electronic Systems, vol. 5, No. 3, pp. 682-704, 2000.
Park, S. et al., "Novel Technique to Use Scratch-pad Memory for Stack Management", In Proc Date pp. 1478-1483, 2007.
Shrivastava, A. et al., "A Software-Only Solution to Use Scratch Pads for Stack Data", IEEE Transactions on Computer-Aided Design of Integrated Circuits and Systems, vol. 28, No. 11, pp. 1719-1727, 2009.
Smith, J.E., "A Study of Branch Prediction Strategies", In Proc of ISCA, pp. 135-148, 1981.
Steinke, S. et al., "Reducing Energy Consumption by Dynamic Copying of Instructions onto Onchip Memory", onchip memory. In ISSS '02: Proceedings of the 15th international symposium on System Synthesis, pp. 213-218, New York, NY, USA, 2002. ACM.
Steinke, S. et al., "Assigning Program and Data Objects to Scratchpad for Energy Reduction", In Proc Design, automation and test in Europe (Date), p. 409, 2002.
Udayakumaran, S. et al., "Dynamic Allocation for Scratch-Pad Memory using Compile-Time Decisions", Trans. on Embedded Computing Sys., 5(2):472-511, 2006.

(56) References Cited

OTHER PUBLICATIONS

Verma, M. et al., "Overlay Techniques for Scratchpad Memories in Low Power Embedded Processors", Very Large Scale Integration (VLSI) Systems, IEEE Transactions on, 14(8):802-815, Aug. 2006.

Verma, M. et al., "Scratchpad Sharing Strategies for Multiprocess Embedded Systems: A First Approach", In ESTImedia, pp. 115-120, 2005.

Verma, M. et al., "Cache-Aware Scratchpad Allocation Algorithm", In Proc Design, automation and test in Europe—vol. 2 (Date'04), p. 21264, 2004.

* cited by examiner (a) Stack before function F4 is called (b) The _fci() before function F4 will evict stack frames of F0 and F1 out of local memory, and makes space for frame of F4.

(a) SSDM against ILP and CSM (b) Overhead comparison between SSDM and CSM

Stack Space W = 192 bytes, library execution time $\tau_0$ = 50 ns,
DMA base latency $\tau_{base}$ = 91 ns, DMA increasing rate $\tau_{slope}$ = 0.075

A:

Segment: <F0>,<F1>,<F1>,<F2>,<F3>,<F4>

| Cut | 1 | 2 | 3 | 4 |
|---|---|---|---|---|
| Removing benefit | 2104 | 12080 | 5920 | 1256 | iteration 1 ⇒

B:

Segment: <F0>, <F1,F2>, <F1>,<F3>,<F4>

| Cut | 1 | 3 | 4 |
|---|---|---|---|
| Removing benefit | 2224 | 6400 | 1256 | iteration 2 ⇒

C:

Segment: <F0>, <F1,F2,F3>,<F1>,<F4>

| Cut | 1 | 4 |
|---|---|---|
| Removing benefit | x | 1256 | iteration 3 ⇒

D:

Segment: <F0>, <F1,F2,F3>,<F1,F4>

| Cut | 1 |
|---|---|
| Removing benefit | x |

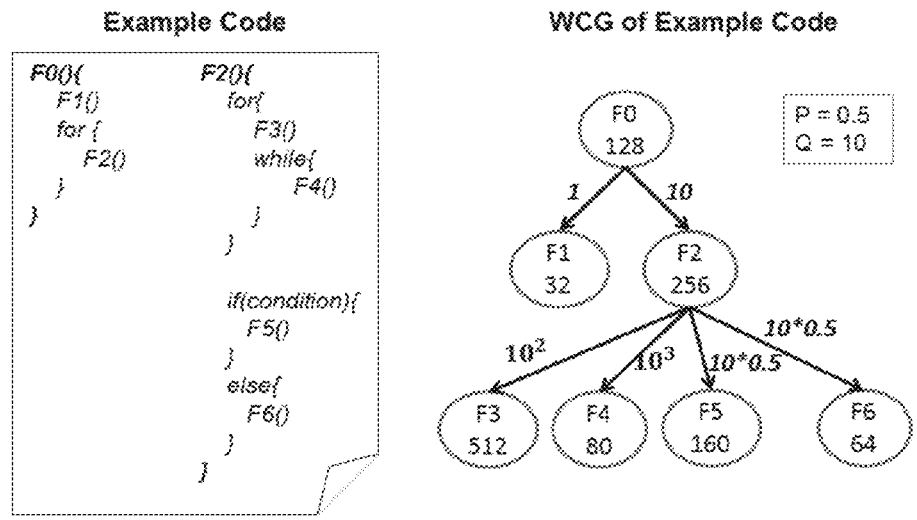
FIG. 10
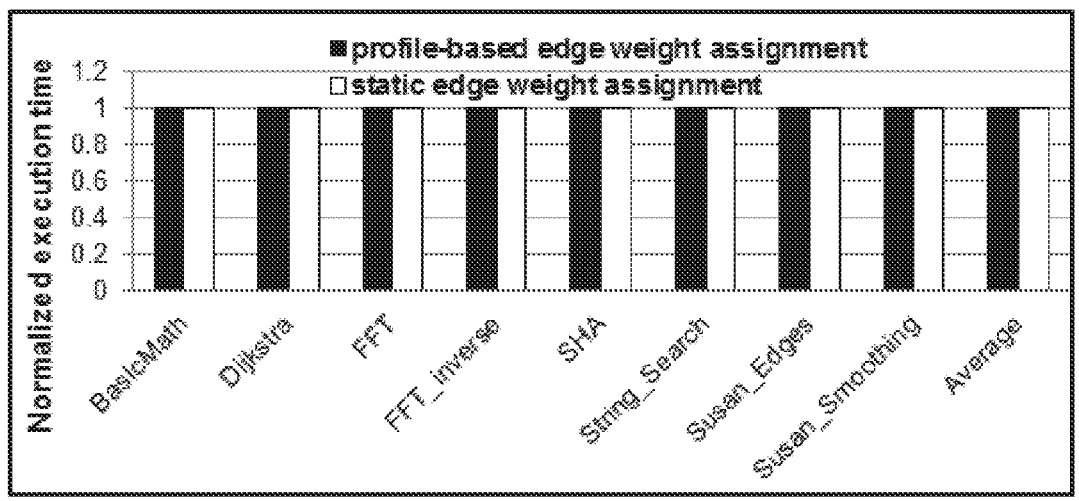
FIG. 11
```
            C                          GIMPLE IR
    val = **stack_ptr;        ⟹     D.2348 = *stack_ptr;
                                     val = *D.2348;
```
FIG. 12

Figure 15: Comparison against cache

```
F1() {
    int a = -1, b = 3, *ptr = &a, **p_ptr = &ptr;

fci(fss_of_F2);
    F2(b, ptr, p_ptr);
    fco();
}

F2(int b, int *ptr, int **p_ptr){
    if(b == 1) {
        printf("val = %d\n", *ptr);
        **p_ptr = 1;
        return;
    } fci(fss_of_F2);
    F2(--b, ptr, p_ptr);
    fco();
}
```

(a) Code after pointer management function insertions (b) Address mapping between global addresses and local addresses

STACK DATA MANAGEMENT FOR SOFTWARE MANAGED MULTI-CORE PROCESSORS

CROSS-REFERENCE TO RELATED APPLICATIONS

This application claims priority to U.S. Provisional Application No. 61/781,642 filed Mar. 14, 2013, the entire contents of which is specifically incorporated by reference herein without disclaimer.

STATEMENT REGARDING FEDERALLY SPONSORED RESEARCH OR DEVELOPMENT

This invention was made with government support under Grant No. 0916652 awarded by the National Science Foundation. The government has certain rights in the invention.

BACKGROUND

1. Field of the Invention

The present invention relates generally to stack data management in multicore processors. More particularly, it relates to techniques for stack data management in scratch-pad based multicore processors and Limited Local Memory (LLM) multicore processors.

2. Description of Related Art

As processors transition from few-core processors to many-core processors, scaling the memory architecture is becoming an important challenge. Intel dual core, quad core, and Nehalam architectures are shared memory architectures, in which the coherent caching mechanisms, typically implemented in hardware, provides the illusion of a single unified memory to the applications. This allows applications written in the unicore era to run on multi-core processors. Even with recent advances in lazy cache coherence protocols, implementing hardware cache coherence for many-core processors has too high overhead in terms of both power and performance.

A promising option for a more power efficient and scalable memory hierarchy is to have only scratchpad memory in the cores. Since scratchpads consume 30% less area and power than a direct mapped cache of the same effective capacity, Scratchpad based Multicore Processor (SMP) architectures can be extremely power efficient. A very good example of SMP memory architecture is the Cell processor that is used in the Sony Playstation 3. Its power efficiency is around 5 GFlops per watt, while the power efficiency of an Intel i7 4-core Bloomfield 965 XE is only 0.5 GFlops per watt.

Scratchpad based Multi-core Processor (SMP) architecture is a truly "distributed memory architecture on-a-chip." Therefore, applications on it require programmers to write a bunch of interacting tasks. The tasks are then mapped to the cores of the SMP architecture. Conventionally, a main task executes on a main core and creates execution tasks, which are then distributed and executed on execution cores. The main core has a large global or main memory, but execution cores have only a small local memory (the scratchpad memory). The execution cores can directly access only their local memory. To access other memories, including the global memory, explicit Direct Memory Access (DMA) instructions are needed in the application. In such architectures, the local memory is shared among code, and all data (stack, global and heap) of the task executing on the core. If the task can fit into the local memory, then extremely power-efficient execution can be achieved—and this is indeed the promise of SMP architectures.

However, for the general case, when all the code and data of the task do not fit in the local memory, explicit data management must be done to enable its execution. The programmer can do this, by bringing in the data/code before it is needed, and evicting it back to the global memory after it is no longer needed. However, this is very difficult, since the programmer must now not only be aware of the local memory available in the architecture, but also be cognizant of the memory requirement of the task at every point in the execution of the program. Estimating the memory requirement is difficult for C/C++ programs, as although the code and global data sizes are known at the compilation time, stack and heap sizes may be variable and input data dependent. This difficulty of programming these SMP architectures has been the biggest roadblock in the success of extremely power efficient SMP architectures.

To enable execution on the core of SMP architecture, all code and data must be managed on the local scratchpad, and researchers have started to develop techniques to manage code, stack data and heap data for cores with only scratchpad memories. Of these techniques, developing efficient approaches to manage stack data is especially important, since an average of 64% of all accesses in embedded applications may be to stack variables.

Another type of processor architecture is a Limited Local Memory (LLM) architecture. Limited Local Memory (LLM) multi-core architectures are scalable, distributed memory architectures, that are quite power-efficient. In an LLM multi-core processor, each core has a scratch pad like local memory, which is not cached. Any data transfers between the global memory and the local memory must be explicitly present as Direct Memory Access (DMA) commands in the application. The IBM Cell BE is a good example of LLM multi-core architecture, which has a 256 KB local memory on each core.

LLM multi-core architectures are programmed in a multi-threaded paradigm with MPI (Message Passing Interface) like explicit communication between the threads. The application threads are mapped to the cores. If the entire code and data of the thread executing on the core can fit into the local memory of the core, the application will execute extremely power efficiently—and this is indeed the promise of LLM multicore architectures. However, if the data requirements of the thread exceed the size of the local memory, there are probably two options: First, the programmer can re-partition and re-parallelize the application by changing the algorithm. However changing the natural way of parallelization of an application can be counterintuitive and a formidable task. Second, the programmer can manage thread data in the local memory. This implies inserting DMA calls to bring data before it is needed, and to evict not-so-urgently needed data out of the local memory, so that it is possible to operate within the local memory size constraints.

The chief attraction of the second option, i.e. data management, is that it keeps application programming natural and easy, and the data management problem may be simpler, since it is local to a thread (and core). In the absence of any tools or libraries that assist in data management (i.e., a compiler), it is typically done manually, and requires a programmer to know which variables are needed and should be brought into the local memory, and which ones are not so urgently needed, and therefore can be evicted out of the local memory for a while.

Thus, there is a need for improved systems and methods for managing stack memory in SMP and LLM architectures.

SUMMARY

In an embodiment, a computer-implemented method to compile software into executable code for execution on a processor having an associated local memory for storing stack frames and a global memory is disclosed. The method comprises adding calls to stack store instructions (_sstore) for copying all stack frames from local memory to global memory to create a stored stack state to said software; adding calls stack load instructions (_sload) for copying the stored stack state from global memory to local memory to said software; and compiling said software into executable code.

The method may also comprise generating a weighted call graph of said software; and determining locations to add said stack store (_sstore) and stack load instructions (_sload) using the weighted call graph. An optimal cutting of the weighted call graph may contain a set of cuts that forms a set of segments, where each segment satisfies a weight constraint and a total cost of the segments is minimal.

The step of determining locations may be performed in accordance with an SSDM heuristic.

The method may also comprise analyzing said software to determine where to add calls to pointer stack management functions; and adding calls to said pointer stack management functions.

The step of analyzing software may comprise collecting must-alias set and may-alias set for each stack pointer p.

The method may also comprise calculating stack sizes of functions between stack pointer p and all of its aliases; and adding calls to instructions for managing the stack pointer p if it is larger than the size of the stack space.

The stack store and stack load functions may be implemented in a runtime library.

In another embodiment, a method of managing stack space in a local memory of a processor which is associated with a global memory comprises instantiating stack frames in the stack space until a management point, the stack frames forming a stack state; calling a stack store function for copying the stack state to the global memory at the management point; and calling a stack load function for copying the stack state from global memory to return the stack state to local memory.

In another embodiment, a computer-implemented method to compile software into executable code for execution on a processor having an associated local memory for storing stack frames and a global memory comprises adding calls to stack management functions _fci and _fco before and after each function call, wherein said function _fci checks for available stack space in the local memory and requesting an allocation of more space in the global memory if there is not sufficient local memory; adding calls to pointer resolution functions p2s and s2p functions before and after each stack data reference, wherein p2s and s2p maintain an exact address mapping of all stack frames residing in local memories and global memory and translate local addresses to global addresses and vice versa; and compiling said software into executable code.

The function s2p may convert the local address of a variable into a global address by computing an offset of the variable using a stack start address in the local memory and using the offset to move relatively in the global memory to reach the pointer location.

The executable code may implement a thread on a main core to listen to requests for allocation of memory. More memory may be allocated than requested amount of memory.

The functions _fci, _fco, p2s and s2p may be implemented in a run time library.

The method may further comprise implementing a stack management table (SMT), said SMT comprising a bookkeeping data structure for stack data management. The stack management table may be dynamically managed by setting an initial fixed size and exporting the table if it gets filled.

In an embodiment, a non-transitory computer readable medium comprises code to execute the steps of any of the preceding methods.

In an embodiment, a non-transitory computer readable medium comprises executable code compiled in accordance with any of the preceding methods.

I In an embodiment, an apparatus comprises a local memory; a global memory; and a processor coupled to the local memory and to the global memory, wherein the processor is configured to execute the steps comprising any of the preceding methods.

In an embodiment, an apparatus comprises a local memory; a global memory; and a processor coupled to the local memory and to the global memory, wherein the processor is configured to execute executable code compiled in accordance with any of the preceding methods.

BRIEF DESCRIPTION OF THE DRAWINGS

Other characteristics and advantages of the present invention will emerge upon reading the following description of an embodiment, this description being made with reference to the drawings attached in the appendices, in which:

FIG. 10 is an example showing static edge weight assignment;

FIG. 11 illustrates the performance of static edge weight assignment vs. profile-based edge weight assignment.

FIG. 12 is an example of the transformation from C code to GIMPLE IR by using a modified compiler;

DESCRIPTION OF ILLUSTRATIVE EMBODIMENTS

Figure 1:
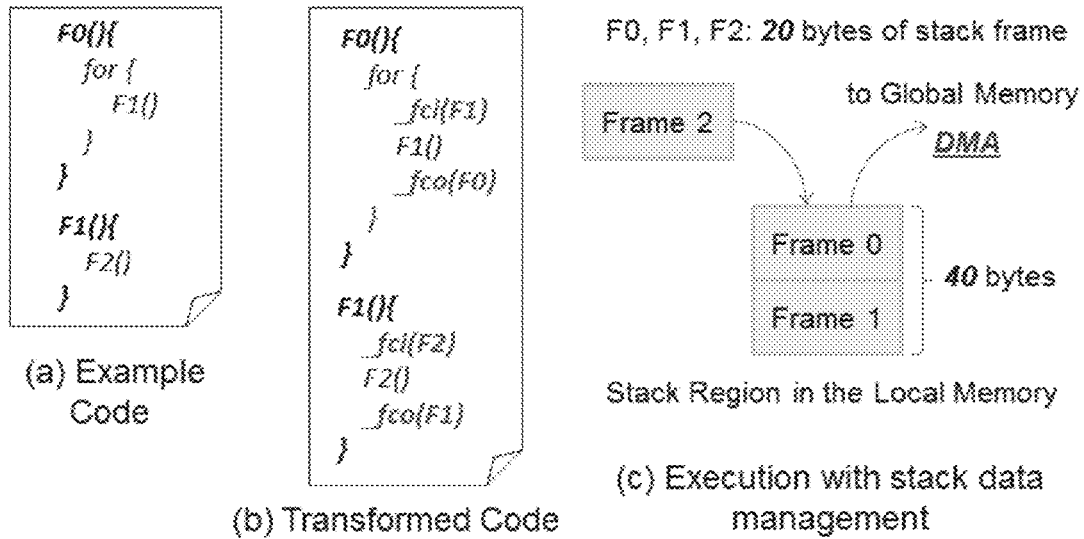
FIG. 1 illustrates function-level stack management.

In the following detailed description, reference is made to the accompanying drawings, in which are shown exemplary but non-limiting and non-exhaustive embodiments of the invention. These embodiments are described in sufficient detail to enable those having skill in the art to practice the invention, and it is understood that other embodiments may be used, and other changes may be made, without departing from the spirit or scope of the invention. The following detailed description is, therefore, not to be taken in a limiting sense, and the scope of the invention is defined only by the appended claims. In the accompanying drawings, like reference numerals refer to like parts throughout the various figures unless otherwise specified.

I. Stack Data Management for Scratchpad Memory

Scratchpad memories have been used in embedded systems for a long time, since they may be faster, and lower-power than caches. However, unlike caches (in which the data management is in hardware and software is completely oblivious of it), the data management must be done explicitly in the software in order to use them. As a result, techniques have been developed to manage code, global variables, stack data and heap data on scratchpad memories. However, these solutions are not applicable for SMP cores because of the difference in memory hierarchy of SMP cores and the traditional embedded cores. In typical embedded cores, the scratchpad memory is in addition to the regular cache hierarchy. This implies that applications can execute on embedded cores without using the scratchpad. However, frequently needed data can be mapped to the scratchpad memory to improve performance and power. On the other hand, the scratchpad is the only memory in the core of SMP architecture. Therefore everything must be accessed through the scratchpad, the only question is how to perform the management correctly and efficiently.

Researchers have started developing techniques to manage code, stack data and heap data on the local scratchpad memory of the core for SMP architectures. This application focuses on stack data management, since an average of 64% of all accesses in embedded applications may be to stack variables.

Previous stack data management techniques propose to manage stack data at function level granularity. This is done through code transformations shown in FIG. 1. FIG. 1(a) shows an example original code, and (b) shows the transformed code. The _fci( ) and _fco( ) calls are inserted before and after each function call. The function stub _fci makes space for the about-to-be-called function (by removing previous function frames). The function stub _fco( ) brings back the frame of the calling function, in case it was evicted. The execution of the transformed program is depicted in (c), which shows that if the space for stack was 40 bytes, and each function frame was 20 bytes, then when function F2 is called, there is no more space for it. The _fci( ) will evict the frame of F0 out of the local memory to make space for the stack frame of F2. The _fco at return from function F1, will bring the function frame of F0 back in the local memory.

Figure 2:
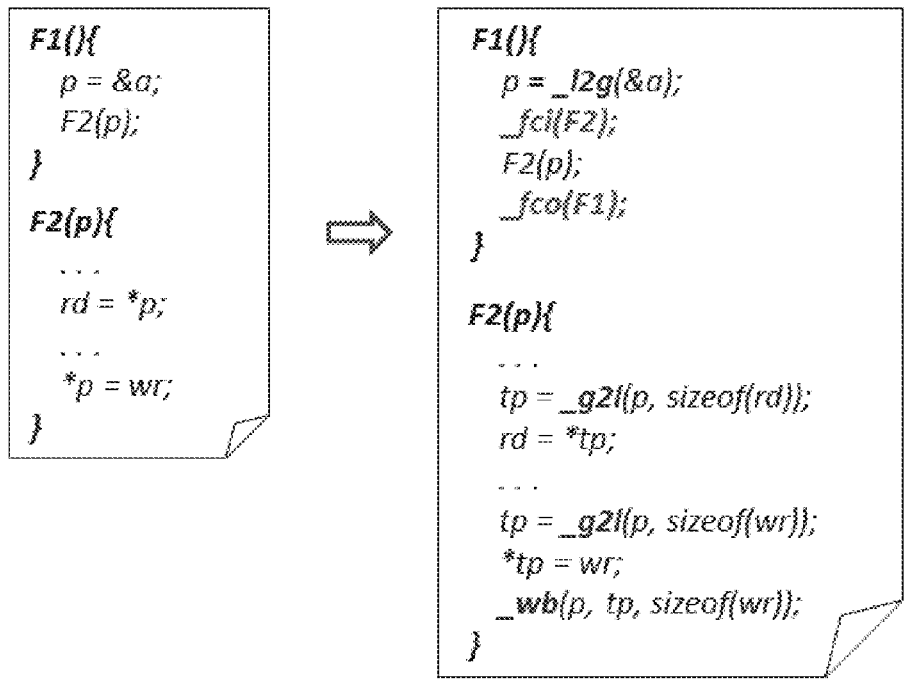
FIG. 2 illustrates pointer management in an example.

If a function accesses stack variables of another (ancestor) function through pointers (that may be passed to it as function parameters, or in other data structures), then there may be a problem. The problem, as shown in FIG. 2 is that the pointer to a stack variable will be to a local address, since the stack is created in the scratchpad. However, when the pointer to a stack variable of an ancestor function is accessed, that function stack frame may have been evicted by the stack data management. Then the pointer will point to a wrong value. Previous techniques have been proposed to extend the stack management approach to handle pointers correctly. One proposed technique to resolve pointers is to convert the local addresses of the pointers to their global addresses at the time of their definition (through the use of _l2g function stub), and at the time of pointer access, the data pointed to is brought into the local memory (through the use of _g2l function stub), and finally, after the program is done accessing, it is written back to the global memory (through the use of _wb function stub).

A conventional stack data management scheme enables managing stack data of any task on any amount of space on the scratchpad and manages all pointers correctly. However, the management overhead is high, and the management is not optimized. The objective of the methods and systems disclosed in this application is to optimize the stack data management, and reduce its overhead. As set forth below, optimization opportunities lie in several areas.

First, there are optimization opportunities in increasing the granularity of management. Not only in SMP architectures, but in all multicore architectures, as the number of cores increases, the memory latency of a task will be very strongly dependent on the number of memory requests. This is because memory pipelines are becoming longer, and a large part of latency is the waiting time to get the chance to access memory. Therefore, it will be better to make small number of large requests, than large number of small memory requests. So the question is: how to increase the granularity of stack data management, even beyond function stack frames.

Second, there are optimization opportunities not performing management when not absolutely needed. In existing approaches, the function _fci( ) and _fco( ) are inserted before and after each function call. Many times, these functions will not result in any data movement. For example, if there is space for the stack frame of the to-be-called function, then no DMA is required, only some bookeeping happens. Much of the overhead is due to calling these functions, even though they are not needed. So, the question is how to not insert _fci( ) and _fco( ) functions when not needed.

Figure 3:
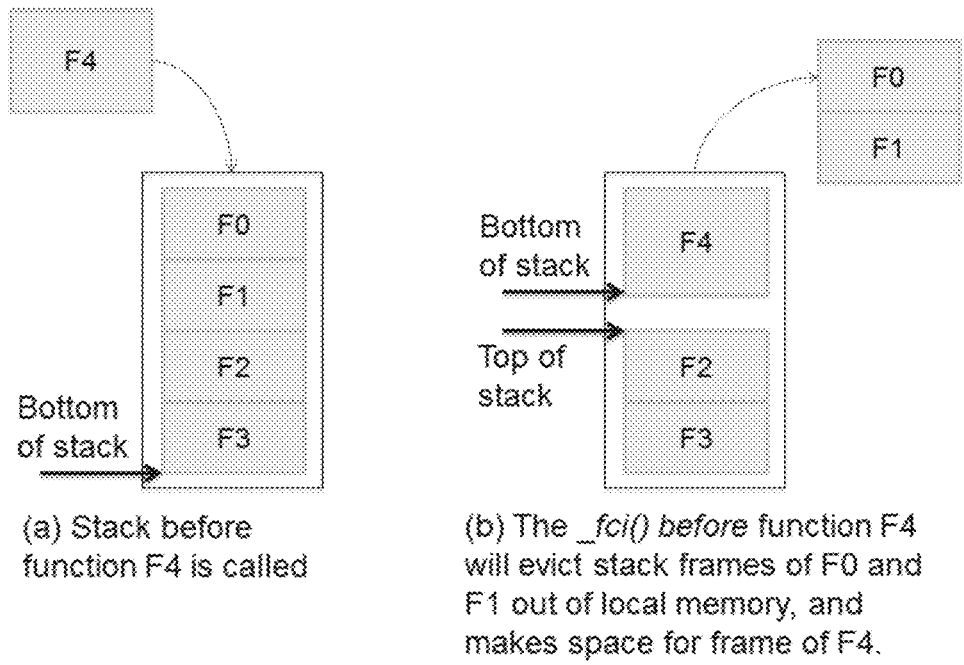
FIG. 3 illustrates a circular stack management technique.

Third, there are optimization opportunities in performing minimal work each time management is performed. In conventional circular stack management approaches, the older function frames are evicted from the top, and new frames can be instantiated as soon as enough space is available. FIG. 3 shows that although this results in a judicious usage of local memory space for stack management, it makes the bookkeeping of the space extremely complicated. As different functions may have different stack frame sizes, the stack space will get fragmented after some time. To be able to track the status of the stack space, a data structure is required. It needs to reserve the stack size of each function, where the frame is stored in the global memory, what the starting address and the end address of the free slots in the scratchpad memory, so on and so forth. In the library function, these variables need to be checked and updated accordingly, which therefore slows down the application.

Fourth, there are optimization opportunities in not performing pointer management when not needed. Although accessing local variables of ancestor function is a poor programming practice, and should be avoided, if a programmer does that, the present technique ensures correct execution of the program through library functions _l2g( ), _g2l( ), and _wb( ). Executing these functions results in extra instruction overheads. These extra instructions can be avoided, when it can be guaranteed that when the function is called, its ancestor function (whose stack variable the function is accessing) is in the local memory.

Figure 4:
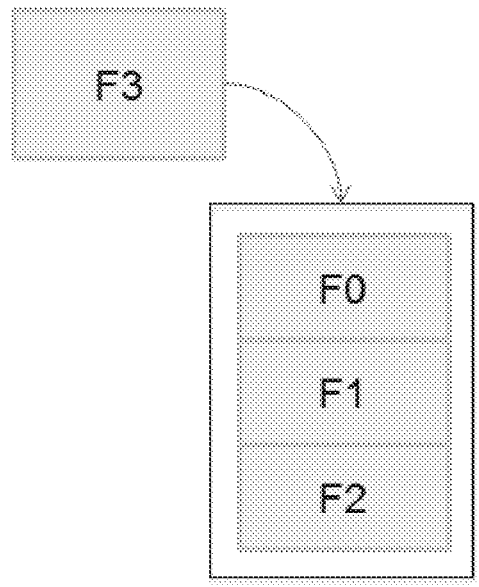
FIG. 4 illustrates an example of thrashing that occurs when stack data is managed at stack space level.

To optimize the stack data management, and reduce its overhead, systems and methods to perform stack data management (i.e., transfer stack data between scratchpad and global memory) at the whole stack space granularity are disclosed. In other words, stack frames are instantiated in the local memory until the management point. At the time of management, the whole stack space is written out to the global memory. When returning from the last frame in the local memory, the whole stack state is copied from the memory to the scratchpad. Since this is no longer at function level, the management functions are renamed to _sstore, and _sload. This approach of performing management at stack space level granularity has several advantages. First is obviously that the granularity of stack data management is much coarser (than function level), and therefore there will be fewer DMA calls. Second is that the management library (functionality of _sstore( ) and _sload( )) becomes simpler, since now the scratchpad is managed as a linear queue, rather than circular queue. A problem that can happen in this scheme is that of thrashing. FIG. 4 illustrates the problem. This happens when the stack space is full just before entering a loop with high execution count in which another function is called. Then every time the function is called, the stack state will be written back to the global memory, and reloaded on return. However, this can be avoided by carefully placing the scratchpad functions _sstore and _sload in the program.

In the next section, the problem of optimal placement of these stack data management functions is discussed and the management function placement problem is shown as that of finding an optimal cutting of a weighted call graph (WCG). Next, an Integer Linear Program solution to the problem is formulated, and then a heuristic (SSDM) is disclosed to solve this problem efficiently. Finally, a non-obvious advantage to this approach is that once the writeback (and reload) function placement is known, pointer management can be optimized. This is because it will become possible to know whether the function—which accesses a stack variable of an ancestor function—and its ancestor function will be in the scratchpad memory at the same time or not. That analysis is performed next, and then the advantages of the disclosed approach is demonstrated through experiments.

A. Problem Formulation

Figure 5:
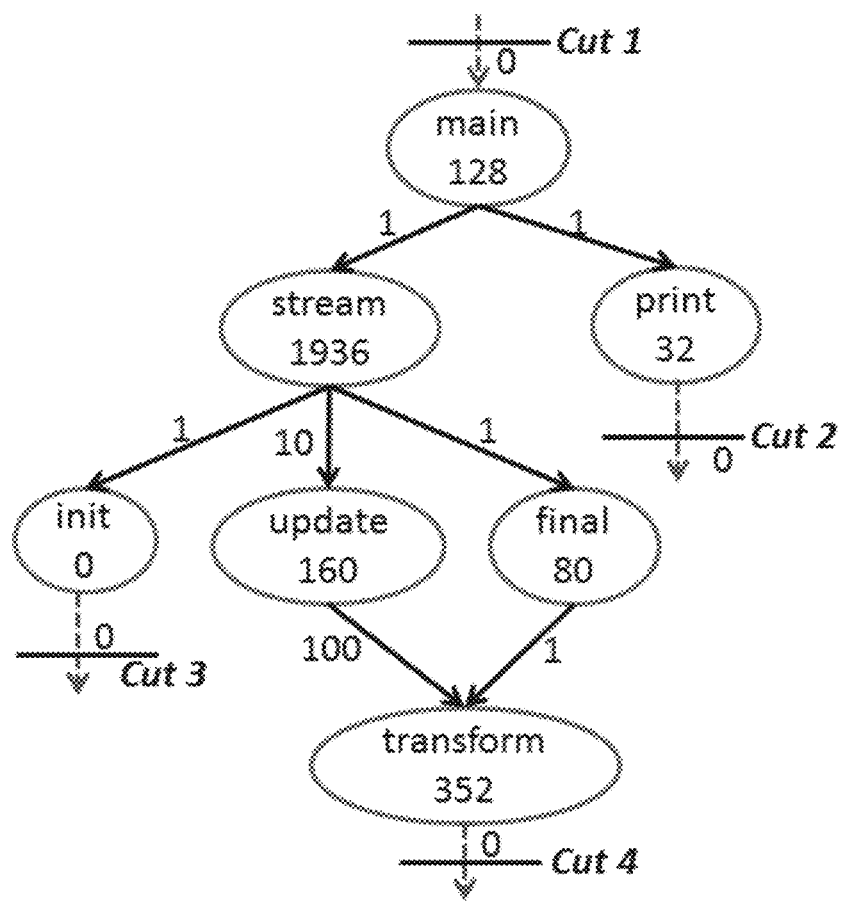
FIG. 5 shows the Weighted Call Graph (WCG) of the benchmark SHA.

A weighted call graph (V; E; W; T) contains a function node set V and a directed edge set E. Each node represents a function call, and each directed edge pointing from the caller to the callee represents the calling relationship between two functions. Weight set W={w1; w2; ...} represents stack sizes of function nodes. Value on each edge eij (eij∈E) from the value set T={t1; t2; ...} corresponds to the number of times function node vi calls vj. FIG. 5 shows the Weighted Call Graph (WCG) of the benchmark SHA.

A root node is the node with no in-coming edges. There is only one root node in the weighted call graph, which is usually the \main" function in a program. A leaf node is the node that has no out-going edges. Those are functions that do not call any other functions. However, for the convenience of problem formulation, an artificial in-coming edge is added to the root node with value 0, and an artificial out-going edge to the leaf node with value 0. A root-leaf path is a sequence of nodes and edges from the root to any leaf node. For example, main-stream-init is a root-leaf path in FIG. 5.

A cutting of the graph is deemed as a set of cuts on graph edges. A cut on an edge eij (eij∈E) corresponds to a pair of function _sstore and _sload inserted respectively before and after function vi calls function vj. As shown in FIG. 5, a set of cuts have been added on artificial edges in advance.

A list is used to represent the collection of nodes on a rootleaf path between two cuts. A list of nodes is referred to as a segment. In FIG. 5, the segment between cut 1 and cut 2 is <main, print>. A node can belong to multiple segments, e.g., node stream can be in both segment <main, stream, init> and <main, stream, update, transform>. As the total function frame sizes in the local scratchpad memory cannot exceed the size limit of stack space, a positive weight (the size of stack space) constraint W is imposed on each segment so that the total weight (stack sizes) of functions in a segment will not exceed W. Therefore, given a segment s={f1; f2; ...} with function weights {wf1; wf2; ...}, the total weight must satisfy the weight constraint $$\sum_{f_i \in s} w_{f_i} \leq W \tag{1}$$

The cost of stack data management for each segment s comprises of two components: i) the running time spent on extra instructions caused by _sstore and _sload function calls, and ii) the time spent on data movement between the global memory and the local scratchpad memory. Let us assume a segment s={f1; f2; ...} is formed with two cuts on edges estart and eend, the functions in this segment have weights {wf1; wf2; ...}, and the two edges have values $t_{start}$ and $t_{end}$, the first part of the cost can be represented as $$cost_1 = t_{end} \times \tau_0 \tag{2}$$

where $\tau_0$ is a constant which represents the average execution time for extra instructions in run-time library (in both _sstore and _sload function), and tend is the number of function calls. The time spent on data movement is linearly correlated to the size of DMA, which equals to the total function stack sizes in a segment. As a result, the second cost can be represented as $$cost_2 = t_{end} \times 2\left(\tau_{base} + \tau_{slope} \times \sum_{f_i \in s} w_{f_i}\right) \tag{3}$$

where $\tau_{base}$ is the base latency for any DMA transfer, $\tau_{slope}$ is the additional latency increasing rate with data size, and 2 shows the consideration for DMA data transfer in and out. Therefore, the total cost for each segment s can be calculated as $$cost_s = cost_1 + cost_2 \tag{4}$$

For a set of cuts on a Weighted Call Graph (WCG) that forms a set of segments S={s1; s2; ...}, the total cost can be represented as $$cost_{WCG} = \sum_{s_i \in S} cost_{s_i} \quad (5)$$

B. Disclosed Heuristic: SSDM

SSDM initially cuts all edges, and then checks all edges to see whether there is a cut on the edge. When a cut is found, the disclosed algorithm searches upward and downward through each root-leaf path to get its nearest neighboring cuts. Next all segments related to this cut are formed by extracting all function nodes between the cut and its neighboring cuts. Thereafter, the total cost of those segments is calculated with Equation 2-5. Now this cut is assumed to be removed, and new segments are constructed by combing upward segment and downward segment in the same root-leaf path. If none of these new segments violates the memory constraint of stack space, the new total cost is again calculated. Otherwise, this cut could not be removed. By subtracting the newer one from the older one, the removing benefit of this cut is obtained. The removing benefit of other cuts can be calculated through the same method. When all calculations are done, SSDM picks the largest one and indeed removes the cut associated with it. It keeps removing the cuts on WCG until no more cuts can be eliminated.

Figure 7:
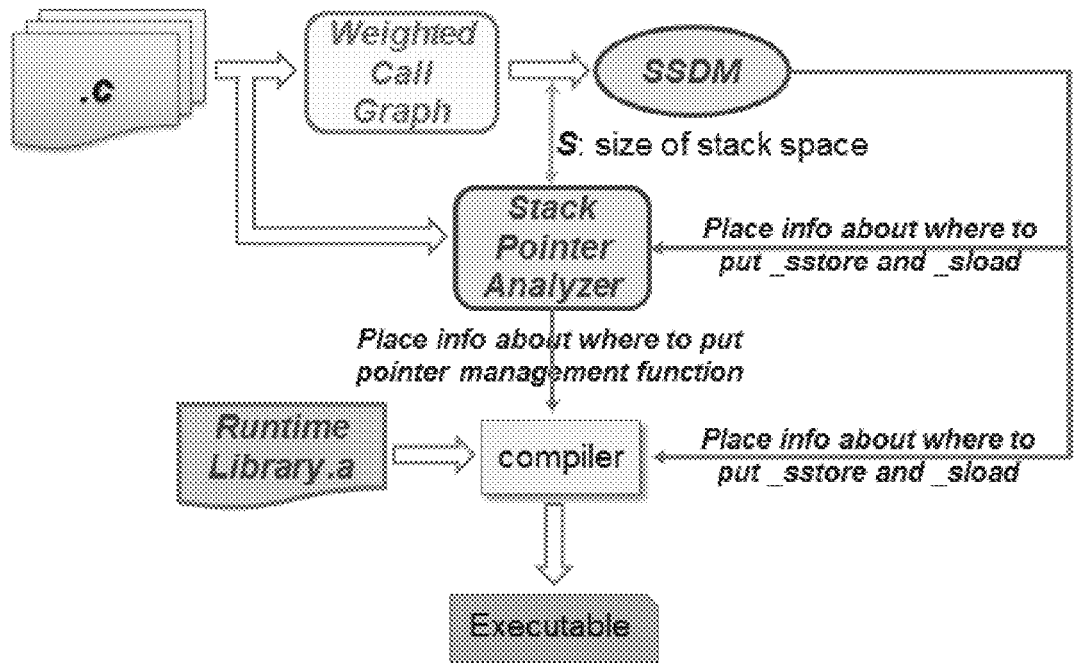
FIG. 7 shows an overview of the disclosed memory management technique.

FIG. 7 shows the flow of the disclosed framework. Firstly, it generates the weight call graph (WCG) of the managed application, and then determines where is the right places to place _sstore and _sload in the program through SSDM heuristic, for a given size of stack space S. Secondly, with this generated information and S, the stack pointer analyzer can analyze the program to figure out locations for inserting pointer management functions. Finally, the modified compiler GCC 4.1.1 can produce the executable with the run-time library and library placement information. Table 1 shows the stack management run-time library and its functionality.

TABLE 1

Library on Stack Data and Stack Pointers.

| Library | Functionality |
| --- | --- |
| _sstore | uses DMA instruction to evict all stack frame(s) from local memory to global memory |
| _sload | uses DMA instruction to get all stack frame(s) in the previous stack state back to local memory |
| _g2l | translates the global address to the local address; gets the value from global mem. if object misses |
| _l2g | translates the local address to a global address |
| _wb | updates data to ancestor frame in global memory |

1. Integer Linear Programming Formulation

In this section, an Integer Linear Programming (ILP) formulation for placing _sstore and _sload functions is disclosed. For a given segment, the cost and total weight can be calculated with Equation 1-5. Given a graph G, all the possible segments can be found out in advance by randomly picking two edges from the graph and putting two cuts on them respectively. Therefore, the optimal _sstore and _sload placement problem can be transformed as to pick out a set of segments from all the possible segments whose total cost is minimal, and they also satisfy the following two conditions: i) the set of segments can make up the complete weighted call graph G, and ii) each segment satisfies the weight constraint.

The weight constraint can be checked with Equation 1, while checking the first constraint is more complicated. For a graph, each edge of the graph can be cut and a smallest segment can be defined as an element, which contains exactly one node and two edges. In the example shown in FIG. 8, the graph is composed of five elements, namely, $<e_0\text{-}F_0\text{-}e_{01}>$, $<e_{01}\text{-}F_1\text{-}e_{13}>$, $<e_{13}\text{-}F_3\text{-}e_3>$, $<e_0\text{-}F_0\text{-}e_{02}>$ and $<e_{02}\text{-}F_2\text{-}e_2>$. Similarly, any segment S in a graph can be represented as a set of elements S={$el_1$, $el_2$, ...}. In the previous example, the segment formed by the cuts on $e_0$ and $e_{13}$ contains two elements, which are $<e_0\text{-}F_0\text{-}e_{01}>$ and $<e_{01}\text{-}F_1\text{-}e_{13}>$. For a segment S and a root-leaf path P, if all nodes in elements that belong to S are also contained in P, $S \subseteq P$, and the segment S can be defined as a subset-segment of P. For example, in FIG. 8, the segment $<F0, F1>$ is a subset-segment of path F0-F1-F3. Apparently, each segment must be a subset-segment to at least one root-leaf path. Now a set of picked segments can be checked to see if it makes up the complete weight call graph G. If each element in the path $P_1$ is contained in one and only one subset-segment of $P_1$, then the picked segments can be claimed to cover path $P_1$. If the picked segments can cover all paths in G, then the picked segments S can be claimed to make up the complete graph G.

Eventually, the problem can be presented as follows:

Input:
W: total weight constraint, it is the size of local memory
E: a set of elements
S: a set of segments
P: a set of root-leaf paths
cost(s): cost of each segment s, where s∈S
weight(s): total weight of each segment s, where s∈S
In(e, s): binary value. For any segment s and element e, it is one if s∈S, zero if otherwise.
subset(s, p): binary value. For any segment s and root-leaf path p (p∈P), it is one if $s \subseteq p$, zero if otherwise.
E(p)={e1, e2, ...}: a set of elements such that $e_i$∈p, p∈P.

Variable:

$$x_s = \begin{cases} 1 & \text{if segment } s \text{ is picked} \\ 0 & \text{otherwise} \end{cases}$$

Objective Function:

$$\sum_{s \in S} cost(s)(x(s))$$

Constraints:

$$\text{weights}(s) \times x_s \leq W, \text{ for } s \in S$$

$$\sum_{s \in S} \text{subset}(s, p) \times \text{In}(e, s) \times x_s = 1,$$

$$\forall\, p \in P,$$

and $$\forall\, e \in E(p)$$

The first constraint is the weight constraint, and the second constraint guarantees that the picked segments can make up the complete graph. It should be noted that each recursive function is treated as a single segment, and add one more constraint for each as follows:

$x_s=1$, $\forall s$ that indicates a recursive function

It ensures a pair of _sstore and _sload is placed right before and after recursive function calls.

2. SSDM Heuristic

---

Algorithm 1: SSDM(WCG(V,E))

1  place cuts on recursive edges, if there are recursive funcs.
2  define vector $\mathcal{C}$, in which $x_{ij}$ indicates if a cut should be placed on edge $e_{ij}(e_{ij} \in E \setminus E_{recursive})$. set all $x_{ij} = 1$.
3  while 1 do
4  |    define vector $\mathcal{B}$ to store removing benefit of each cut.
5  |    foreach $x_{ij} == 1$ do
6  |    |    set boolean violate to false, it shows if removing
   |    |    this cut would violate the weight constraint.
7  |    |    Define total cost $Cost_{before} = 0$.
8  |    |    foreach segment $s\_old_i$ that are associated with
   |    |    $x_{ij}$ do
9  |    |    |    calculate cost $cost\_old_i$ with Equation 2-5.
10 |    |    |_ $Cost_{before} + cost\_old_i$
11 |    |    assume the cut of $x_{ij}$ is removed, and get a new
   |    |    set of associated segments.
12 |    |    Define total cost $Cost_{after} = 0$.
13 |    |    foreach new associated segment $s\_new_i$ do
14 |    |    |    check weight constraint with Equation 1.
15 |    |    |    if weight constraint is violated then
16 |    |    |    |    violate = true
17 |    |    |    |_ break
18 |    |    |    calculate cost $cost\_new_i$ with Equation 2-5.
19 |    |    |_ $Cost_{after} + cost\_new_i$
20 |    |    if violate then
21 |    |    |_ continue
22 |    |    calculate benefit of removing the cut
   |    |    $B_{ij} = Cost_{before} - Cost_{after}$
23 |    |    if $B_{ij} > 0$ then
24 |    |_   |_ store $B_{ij}$ into vector $\mathcal{B}$.
25 |    if $\mathcal{B}$ contains no element then
26 |    |_ break
27 |    find out the largest benefit value $B_{max}$ from $\mathcal{B}$, and
   |_   set the corresponding cut $x_{max} = 0$.

---

Figure 8:
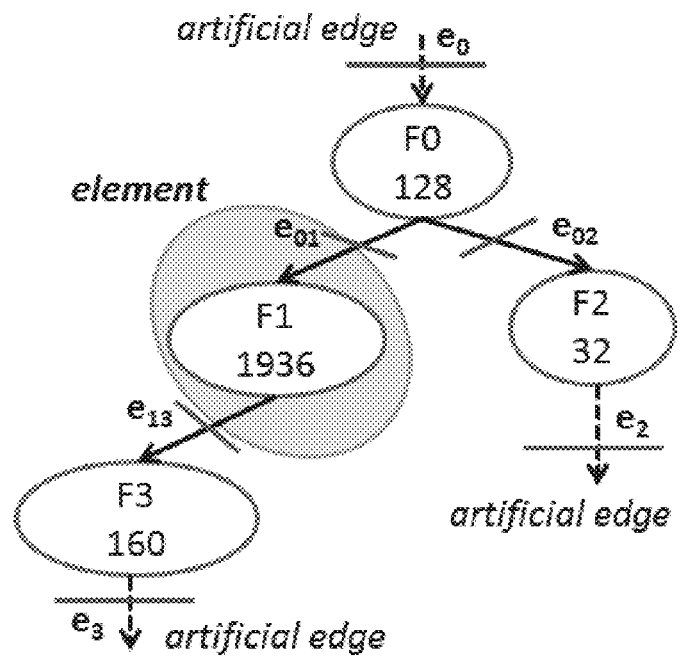
FIG. 8 shows an example of weighted call graph.

In this section, the complete SSDM heuristic for placing sstore and sload library functions is disclosed. As observed from Algorithm 1, Line 1 preprocesses all recursive edges by placing a cut on them. Since _sstore and _sload are statically placed at compile time and recursive function calls itself, a cut may be put on the recursive edge to eliminate the nondeterminacy of recursive functions. In line 8-10, the segments that are associated with each cut x %%% on edge $e_{ij}$ ($e_{ij} \in E$) are found. To do this, all root-leaf path $P_l$, where $e_{ij} \in P_l$ are found. Then each $P_l$ is searched upward until a cut $x_{up}$ is met. Similarly, each root-leaf path $P_l$ is searched downward until a cut $x_{down}$ is met. The segment between $x_{ij}$ and $x_{up}$ or $x_{down}$ is defined as associated with $x_{ij}$. For example, in FIG. 8, the segments that are associated with cut on e02 is the segment <F0> and the segment <F2>. Then the cost of each segment is calculated with Equation 2-5, and the total cost is calculated by summing up the cost of all the associated segments. In Line 11-19, the cut is assumed to be removed, and a new set of associated segments is obtained. Those segments are formed by merging the segment between $x_{ij}$ and $x_{up}$ with the segment between $x_{ij}$ and $x_{down}$ on each root-leaf path $P_l$. As an edge might belong to several root-leaf paths, there might be many $x_{up}$ and $x_{down}$ accordingly. In FIG. 8, after removing the cut on $e_{02}$, the two associated segments are merged into one segment, which is <$F_0, F_2$>. Similarly, the cost of each new segment can be calculated with Equation 2-5, and the total cost of all associated segments after removing the cut. Line 14-17 check if weight constraint is satisfied by removing this cut. If the constraint is violated, this cut will not be considered to be removed (line 20-21). Line 27 removes the cut with largest positive benefit among all the cuts whose removal will not violate the weight constraint. Line 25-26 is the exit condition of the WHILE loop. The procedure stops until no more cuts can be removed from the graph. At this point of time, the remaining cuts either have negative removing benefit, or cannot be removed due to weight constraint.

Figure 9:
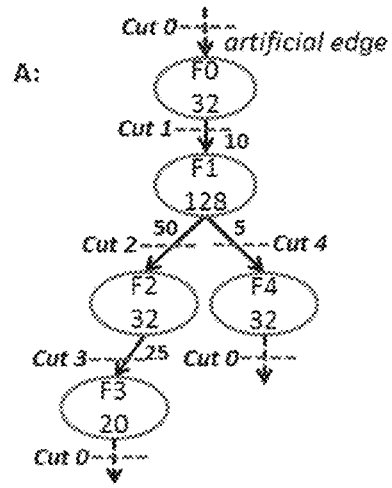
FIG. 9 illustrates the SSDM heuristic.
Figure 9:
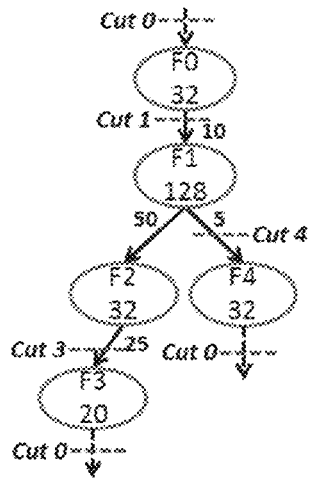
Figure 9:
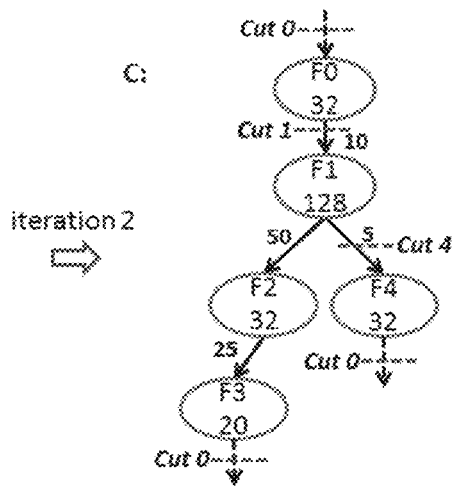
Figure 9:
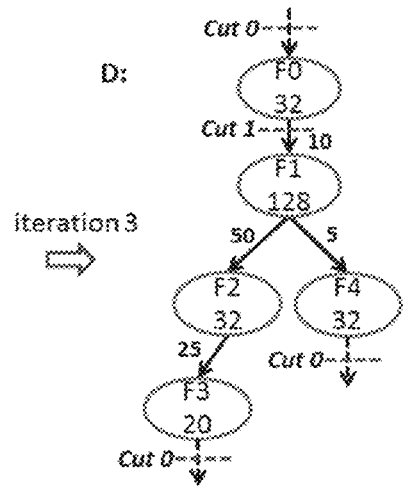

An illustration of SSDM is depicted in FIG. 9. In this example, the stack frames of the example WCG (A) are managed in a 192 bytes stack space. When calculating the stack management cost with Equation 2 and Equation 3, 50 ns is used for $\tau_0$, 91 ns is used for $\tau_{slope}$, and 0.075 is sued for $\tau_{slope}$. As stated before, artificial edges were added for this WCG and an artificial cut was attached for each artificial edge as well. At the initialization stage of SSDM heuristic (line 2 in Algorithm 1), cuts were put on all edges (cut 1-cut 4). Next the removing benefit of all existing cuts was checked, except artificial cuts (line 5-24). Cut 1 will be used as an example to show how to calculate the removing benefit. Before removing cut 1, its associated segments are <$F_0$>, <$F_1$> (between cut 1 and cut 2) and <$F_1$> (between cut 1 and cut 4). The cost for <$F_0$> is 2368=10×50+10×2×(91+0.075×32) (Equation 2-4), the cost for <$F_1$> (between cut 1 and cut 2) is 12560=50×50+ 50×2×(91+0.075×128), and the cost for <$F_1$> (between cut 1 and cut 4) is 1256=5×50+5×2×(91+0.075×128). Therefore, the Cost _before is 16184=2368+12560+1256 (line 8-10). If cut 1 is assumed to be removed, its associated segments become <$F_0, F_1$> (between cut 0 and cut 2) and <$F_0, F_1$> (between cut 0 and cut 4). $Cost_{after}$ (line 11-19) can be calculated as 14080. Therefore, the removing benefit of cut 1 is 2104=16184−14080. Similarly, the removing benefit of all cuts can be obtained, and the benefit table below WCG (A) can be formed. As highlighted with underline, the largest benefit comes from removing cut 2. Then cut 2 is removed and WCG (B) is obtained. Similarly, cuts can be removed one by one through WCG (B) to WCG (D). When WCG (D) is reached, cut 1 can longer be removed, as the removal of cut 1 violates the weight constraint (line 14-17), i.e., the total stack size of segment <$F_0, F_1, F_2, F_3$> is larger than predefined 192 bytes of stack space. Till now, SSDM stops, and therefore WCG (D) is the final result. It indicates that the stack management function sstore must be placed before F1 gets called, and _sload must be placed right after F1 returns.

3. Static Edge Weight Assignment of WCG

A compile-time approach to estimate the number of function calls (the value on the edge) is now disclosed. The basic blocks of the managed application are first scanned for the presence of loops (back edges in a dominator tree), conditional statements (fork and join points) and function calls (branch and link instructions). If a function is called within a nested loop, the number of loops (nl) nested for that function is saved. After capturing this information, weights are assigned on the edges by traversing WCG in a top-down fashion. Initially, they are assigned to unity. When a function node is encountered, the weight on the edges between the node and its descendants are multiplied by a fixed constant, loop factor Qnl. This ensures that a function which is called inside a deeply nested loop will receive a greater weight than other functions. If the edge is either a true path or a false path of a condition, the weight will be multiplied by another quantum, taken probability P. Both paths for a condition are assumed to be executed (P=0.5), which is very similar to branch predication. In addition, Q=10. FIG. 10 shows the resulted WCG of an example code with the static assignment scheme.

The integrity of the static edge weight assignment on edges of WCGs of eight applications was examined, and the execution time of each benchmark with static assignment to its execution time with profile-based assignment was normalized. As demonstrated in FIG. 11, both schemes achieve almost the same performance for the set of benchmarks.

4. Stack Pointer Management

```
        Algorithm 2: StkPtrLibPlacing(global CFG, call graph)
1   find all definitions of stack pointers and put them to $\mathbb{S}$.
2   do AliasAnalysis( $\mathbb{S}$ ) and get must-alias $\mathbb{S}_x(p)$ and
    may-alias $\mathbb{S}_y(p)$, ∀ stack pointer p ∈ $\mathbb{S}$.
3   foreach stack pointer p ∈ $\mathbb{S}$ do
4   |    boolean flag = false
5   |    foreach $p_i$ ∈ $\mathbb{S}_y(p)$ ∪ $\mathbb{S}_x(p)$ do
6   |    |    d = distance (L(p), L($p_i$) ), where L(p) and L($p_i$)
    |    |    are the functions where pointers locate.
7   |    |    if d > $\mathbb{W}$ or existCut(p,$p_i$), where $\mathbb{W}$ is the size
    |    |    of stack region then
8   |    |    |    flag = true
9   |    |_   |_   break
10  |    if flag == true then
11  |    |    use _l2g at L(p) and _g2l & _wb accordingly for
    |_   |_   L($p_i$) (∀$p_i$ ∈ $\mathbb{S}_y(p)$ ∪ $\mathbb{S}_x(p)$) as shown in FIG. 2.
```

Programming with stack pointers in embedded systems is not advocated. However, programmers still might program with stack pointers. In this case, stack pointers must be properly and efficiently managed. A scheme to insert pointer management functions only when necessary is disclosed. Algorithm 2 shows the systematic approach to address this problem. The traditional alias analysis approach to collect must-alias set and may-alias set for each stack pointer p on line 2 is ised. The must-alias means that two pointers are guaranteed to always point to the same memory object. The may-alias is used whenever two pointers might refer to the same object. Then, function distance2 is used to calculate stack sizes of functions between p and all its alias (line 6). If one of them is larger than the size of stack space W, then stack pointers must be managed in a fashion as shown in FIG. 2 (line 7-11). Another situation that requires management is handled by the function existCut. This function takes in the stack pointer and its alias, and then checks whether there exists a cut between the functions where pointer and its alias locate on root-leaf path. When there is one, namely, the memory object pointed by these pointers are moved to the global memory, existCut returns true; otherwise, false is returned.

Multi-level Pointer Support: FIG. 2 only shows an example about how to use the pointer management library on single-level pointers. Here, a method of processing multilevel pointers in applications is presented. The method was implemented on GIMPLE IR (Intermediate Representation) of GCC through breaking down multi-level pointers in C to operations containing only single-level pointers in GIMPLE IR, with artificial pointers generated by the compiler. The reason of choosing GIMPLE IR rather than RTL (Register Transfer Language) IR is that high level information is difficult to be extracted from RTL. For example, pointer information is needed in the disclosed implementation, but the information is lost in RTL. GIMPLE is a three-address IR with tuples of no more than 3 operands, and obtained by removing language specific construct from AST (Abstract Syntax Tree).

If the function that contains the use of stack pointer p is a recursive function (self-recursion or nonself-recursion), distance returns oo shown in FIG. 12, where stack ptr is a pointer-to-pointer in C. In the example, a pointer read statement is transformed to two statements in the GIMPLE IR, with an artificial pointer D.2348 generated by compiler. By this transformation, every statement in the GIMPLE IR only has one single-level reference, and therefore can be managed in a fashion as FIG. 2

5. Impact of Stack Space.

The experiment for each application was conducted under the stack region size specified in Table 2.

TABLE 2

Benchmarks, their stack sizes, and the stack space

| Benchmark | Stack Size (bytes) | Stack Region Size (bytes) |
|---|---|---|
| BasicMath | 400 | 512 |
| Dijkstra | 1712 | 1024 |
| FFT | 656 | 512 |
| FFT inverse | 656 | 512 |
| SHA | 2512 | 2048 |
| String Search | 992 | 768 |
| Susan Edges | 832 | 768 |
| Susan Smoothing | 448 | 256 |

Figure 13:
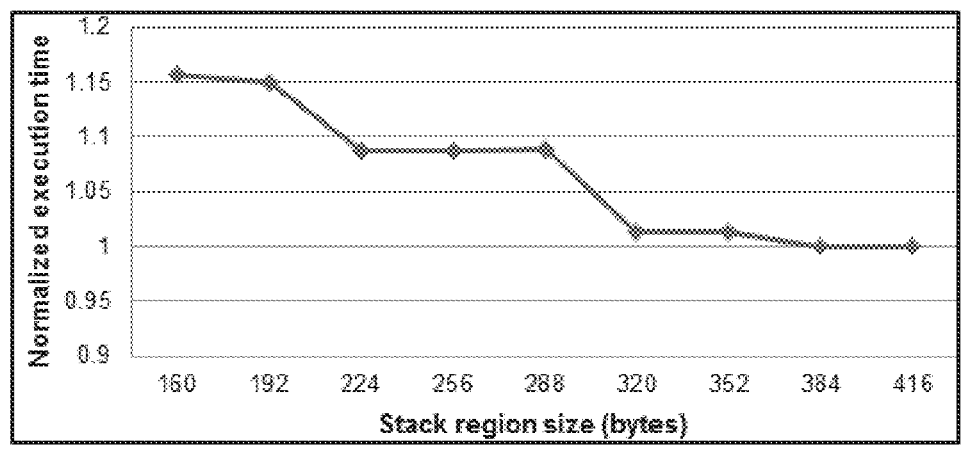
FIG. 13 illustrates the performance of different stack region sizes.

Next another set of experiments was constructed that evaluate the disclosed SSDM technique under tight size constraints. The benchmark Dijkstra contains many nested function calls within loop structures, making it a good candidate for showing the impact of different stack region sizes. The region size was expanded from 160 bytes to 416 bytes with the step size of 32 bytes. The resulted performances are demonstrated in FIG. 13, where the execution times with different stack region sizes were normalized to the smallest one. The execution time decreases when stack region size is increased. When the size reaches 384 bytes, the performance hardly improves. The primary reason is that the recursive function is conservatively managed by always placing a pair of library function around all its call sites. Therefore, although the region size is large enough, no more benefit can be obtained as only the insertion for recursive function print path is left.

6. Scalability

Figure 14:
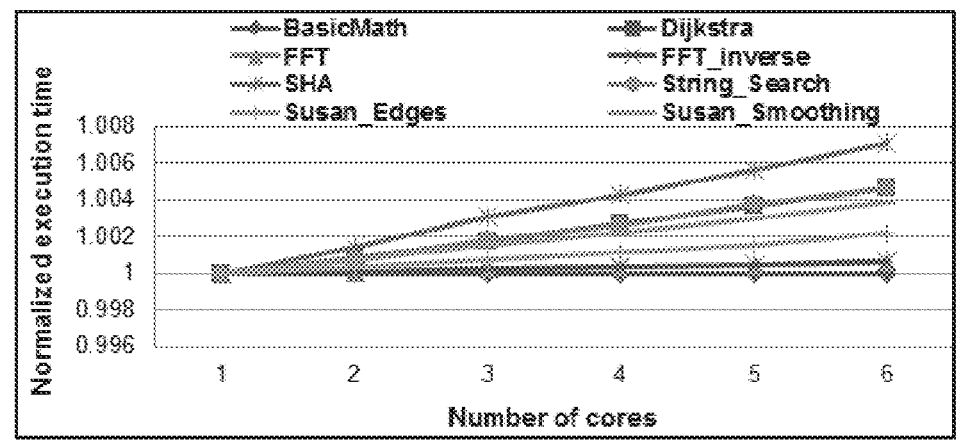
FIG. 14 illustrates the performance of a different number of cores.

FIG. 14 shows the results of testing of the scalability of the disclosed SSDM heuristic. The execution time of each benchmark was normalized with the number of SPEs to its execution time with only one SPE and shown on the y-axis. In this experiment, the same application was executed on a different number of cores. This is very aggressive, since DMA transfers occur almost at the same time when stack frames need to be moved between the global memory and the local memory. This will lead to the competition of DMA requests. As shown in FIG. 14, the execution time increases gradually the number of cores is scaled, but no more than 1%. Benchmark SHA increases most steeply, as there are many stack pointer accesses in this program. Because of this, more data transfers are conducted for objects pointed by those stack pointers As discussed, the stack management overhead comprises DMA time for stack frame transfer and execution of the instructions in the management library functions. However, the DMA time should not be fully counted as overhead. When there is a data miss in the hardware cache, there is also penalty for applications. In Table 3, the differences between cache miss penalty and the overhead of SSDM management is shown. In this experiment, SimpleScalar is used to collect cache misses of stack data. In SimpleScalar, the cache size is configured to equal the size of stack region in the local scratchpad memory. In addition, all the addresses accessed by global data and heap data (if any) were found by profiling the program. Then all data cache misses caused by those addresses were excluded and the misses of stack data were obtained. The penalty per miss used for calculating miss penalty is 91 nano seconds, which is the time of DMA latency on IBM Cell BE. As shown in Table 3, the disclosed stack management scheme has less miss overhead than cache miss penalty of cache-based processors. There are two reasons for less overhead of the disclosed SSDM heuristic: i) stack data are initiated in the local scratchpad memory and DMA occurs only when stack region is full. ii) the management granularity is coarser with stack data management, but the cache line size in cache based architecture cannot be too large.

TABLE 3

Comparison against cache

| | cache | | SSDM miss |
|---|---|---|---|
| | number of | miss | overhead |
| BasicMath | 85751570 | 7803392 | 0 |
| Dijkstra | 5060748 | 460528 | 717 |
| FFT | 9918726 | 902604 | 63 |
| FFT inverse | 7816707 | 711320 | 75 |
| SHA | 29970 | 2727 | 17 |
| String Search | 111386 | 10136 | 161 |
| Susan Edges | 50941 | 4635 | 5 |
| Susan Smoothing | 294864 | 26832 | 13 |

Figure 15:
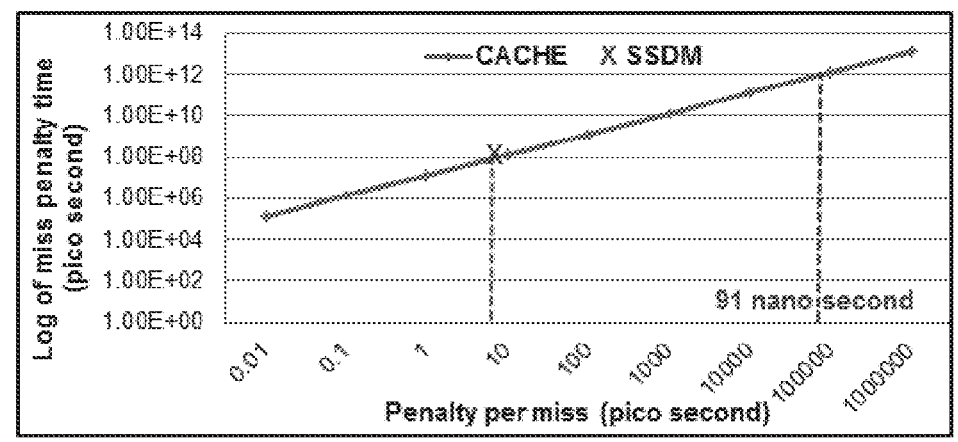
FIG. 15 is a comparison of the performance of the SSDM heuristic against cache.

In the previous experiment, 91 nano seconds was used for cache penalty per miss. Next the miss penalty of cache was varied from 0.01 pico second to 1000 nano seconds. The average number of misses and the average management overhead of eight applications to demonstrate the design alternative were also used. As shown in FIG. 15, when the penalty per miss (p) of cache approaches 10 pico seconds, the total miss penalty of cache is similar to the disclosed SSDM stack data management. When p is less than 10 pico seconds, cache achieves better performance. As 10 pico seconds are merely 0.032 cycle on the Cell BE architecture, the is unlikely. Under feasible circumstances, the disclosed SSDM method has much less penalty than cache has.

C. Optimizing Pointer Management

The compiler should only insert stack pointer management function when necessary. Although the correctness of the program will not be changed, the performance will be degraded by those redundant function insertions. A systematic solution for pointer library insertions is disclosed. It firstly recognizes all pointers to stack data and then utilizes classic alias analysis algorithm to collect must-alias set and may-alias set for each stack pointer. Later, it calculates the total stack sizes between the pointer define place (or function) and use place in a root-leaf path. If the size is smaller than the predefined memory limit and no cut is found on the edge between two functions, no management is required. Otherwise, pointer management is needed. The complete algorithm was presented above.

D. Experimental Results

In this section, the efficiency of the disclosed SSDM technique is compared against the ILP (details were presented above) and previous CSM heuristic approaches. The SSDM heuristic was implemented in the GCC 4.1.1 cross compiler for the Cell SPEs. Eight applications from MiBench suite were considered. The other applications in MiBench suite cannot be executed on SPEs because, to some extent, they lack standard library support, or they have large application code size. The eight applications are modified to be multi-threaded by keeping all I/O functionality of the benchmark in the main thread on PPE and the core functionality is executed on the SPE. The applications were compiled using the modified cross compiler, and then the time of execution on SPE was measured by using spu decrementer. Table 2 shows the maximum stack depth and the size of stack region used for different benchmarks.

Figure 6A:
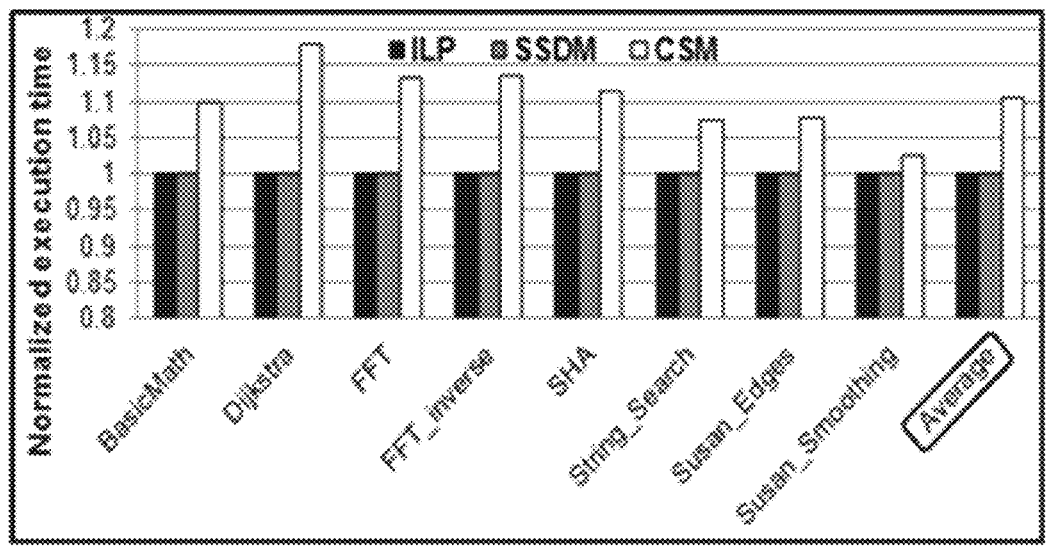
FIGS. 6(a) and 6(b) show data management overhead of the disclosed technique as compared to CSM techniques.
Figure 6B:
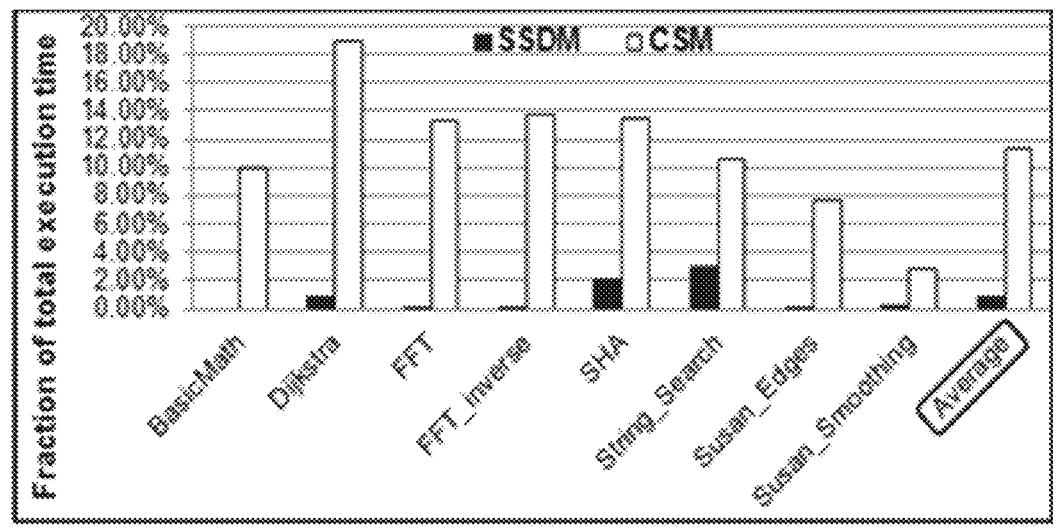

The PPE and 1 SPE available in the IBM Cell BE were used and the SSDM performance was compared against the results from ILP and CSM. The y-axis in FIG. 6(a) stands for the execution time of each benchmark normalized to its execution time that with ILP. In this section, the number of function calls used in Weighted Call Graph (WCG) is estimated from profile information. A compile-time scheme to assign weights on edges was previously presented. Experimental results show that both the non-profiling based scheme and the profiling-based scheme achieve almost the same performance. As observed from FIG. 6(a), the disclosed SSDM technique shows very similar performance to ILP approach. This means the disclosed heuristic approaches the optimal solution when the benchmark has a small call graph. Compared to the CSM scheme, the disclosed SSDM demonstrates up to 19% and average 11% performance improvement. The overhead of the management comprises of i) time for data transfer, ii) execution of the instructions in the management library functions. FIG. 6(b) compares the execution time overhead of CSM and the proposed SSDM. Results show that when using CSM, an average 11.3% of the execution time was spent on stack data management. With the new approach SSDM, the overhead is reduced to a mere 0.8%—a reduction of 13×. Next the overhead is broke down and the effect of the disclosed techniques on the different components of the overhead is explained:

Opt1—Increase in the granularity of management: Due to the stack space level granularity of management, the number of DMA calls has been reduced. Table 4 shows the number of stack data management DMAs executed when CSM is used vs. the new technique SSDM.

TABLE 4

Comparison of number of DMAs

| Benchmark | CSM | SSDM |
|---|---|---|
| BasicMath | 0 | 0 |
| Dijkstra | 108 | 364 |
| FFT | 26 | 14 |
| FFT inverse | 26 | 14 |
| SHA | 10 | 4 |
| String Search | 380 | 342 |
| Susan Edges | 8 | 2 |
| Susan Smoothing | 12 | 4 |

Note that there are no DMAs required for BasicMath. This is because the whole stack fits into the stack space allowed for this benchmark. The disclosed technique performs well for all benchmarks, except for Disjkstra. This is because of the recursive function print path in Dijkstra. CSM will perform a DMA only when the stack space is full of recursive function instantiations, while the disclosed technique has to evict recursive functions every time with unused stack space. As a result, the disclosed technique does not perform very well on recursive programs.

Opt2—Not performing management when not absolutely needed: The disclosed SSDM scheme reduces the number of library function calls because of the disclosed compile-time analysis. In Table 5, the number of _sstore and _sload function calls executed when using SSDM are compared to _fci and _fco calls when using CSM.

TABLE 5

Number of _sstore/_fci and _sload/_fco Calls

| Benchmark | _sstore/_fci | | _sload/_fco | |
|---|---|---|---|---|
| | CSM | SSDM | CSM | SSDM |
| BasicMath | 40012 | 0 | 40012 | 0 |
| Dijkstra | 60365 | 202 | 60365 | 202 |
| FFT | 7190 | 8 | 7190 | 8 |
| FFT inverse | 7190 | 8 | 7190 | 8 |
| SHA | 57 | 2 | 57 | 2 |
| String Search | 503 | 143 | 503 | 143 |
| Susan Edges | 776 | 1 | 776 | 1 |
| Susan Smoothing | 112 | 2 | 112 | 2 |

As observed, the disclosed scheme has much less number of library function calls. The main reason is that the disclosed SSDM considers the thrashing effect discussed in Section 4. The disclosed approach tries to avoid (if possible) placing _sstore and _sload around a function call that executes many times, for example, within a loop. On the other hand, CSM always inserts management functions at all function call sites.

Opt3—Performing minimal work each time management is performed: The disclosed management library is simpler, since it only needs to maintain a linear queue, as compared to a circular queue in CSM. Table 6 shows the amount of local memory required by the SSDM and CSM, where the SSDM runtime library has a much smaller footprint than CSM does.

TABLE 6

Code size of stack manager (in bytes)

| | _sstore/_fci | _sload/_fco | _l2g | _g2l | _wb |
|---|---|---|---|---|---|
| CSM | 2404 | 1900 | 96 | 1024 | 1112 |
| SSDM | 184 | 176 | 24 | 120 | 80 |

It is very important for improving the performance, since stack frames will obtain less space in the local memory if the library occupies more space. The reason for the larger footprint of CSM is that it needs to handle memory fragmentation, while SSDM doesn't have this trouble.

Table 7 shows the cost of extra instructions per library function call. All benchmarks were ran with both schemes and approximately calculated the average additional instructions incurred by each library call.

TABLE 7

Dynamic instructions per function (* F: stack region is full when function is called; NF: stack region is enough for the incoming function frame.)

| | _sstore/_fci | | _sload/_fco | | _l2g | _g2l | | _wb | |
|---|---|---|---|---|---|---|---|---|---|
| | F | NF | F | NF | | hit | miss | hit | miss |
| CSM | 180 | 100 | 148 | 95 | 24 | 45 | 76 | 60 | 34 |
| SSDM | 46 | 0 | 44 | 0 | 6 | 11 | 30 | 4 | 20 |

As demonstrated in Table 7, SSDM performs much better than CSM. There is no cost in SSDM when the stack region is sufficient to hold the incoming frames. However, CSM still needs extra instructions, since it checks the status of the stack region at runtime. hit for _g2l and _wb means the accessing stack data is residing in the local memory when the function is called, while miss denotes stack data is not in the local memory. In CSM approach, more instructions are needed for the hit case than the miss case in the function _wb. This is because the library directly writes back the data to the global memory when miss, but looking up the management table is required to translate the address. More importantly, as the table itself occupies space and therefore needs to be managed, CSM may need additional instructions to transfer table entries.

Opt4—Not performing pointer management when not needed: Stack pointer management is properly managed in SSDM, while CSM might manage all pointers excessively. Table 8 shows the results of four benchmarks with and without pointer optimization technique.

TABLE 8

Number of pointer mgmt. function calls

| | _l2g | | _g2l | | _wb | |
|---|---|---|---|---|---|---|
| | CSM | SSDM | CSM | SSDM | CSM | SSDM |
| BasicMath | 37010 | 0 | 123046 | 0 | 89026 | 0 |
| SHA | 2 | 2 | 163 | 158 | 68 | 68 |
| Edges | 1 | 0 | 515 | 0 | 514 | 0 |
| Smoothing | 1 | 0 | 515 | 0 | 514 | 0 |

They are the only four applications among the eight applications that contain pointers to stack data. The disclosed scheme can slightly improve the performance of SHA, and eliminates the pointer management functions for the other three benchmarks.

More results: Besides comparing results between SSDM and CSM, the impact of different stack space sizes and the scalability of the disclosed heuristic was examined. It was found that i) performance improves as the space for stack data is increased, ii) the disclosed SSDM scales well with different number of cores, iii) the penalty of management is much less with the disclosed SSDM compared to hardware cache.

II. Stack Data Management for Limited Local Memory

The problem of data management in the local memory is similar to the extensively studied problem of data management in scratch pad memories (SPMs) in embedded systems, e.g. the ARM processor; however a major difference exists. In embedded processors, SPMs are typically used in addition to the regular cache hierarchy, and frequently used data can be mapped to the SPM for faster access and lower power. In contrast, in LLM multi-core architectures, the SPM (or local memory) is a part of the only memory hierarchy present. All code/data that is used by the processor must be in the SPM/local memory when it is needed. Therefore, using local memory in LLM cores is not an optimization, but is a necessity. In addition, this SPM use must consider the data access pattern, not only just placing them in the SPM/local memory.

Two important issues in developing any data management methodology are: i) granularity and number of DMAs inserted, and ii) extent and difficulty of changes in the application program. One trivial solution to manage thread data on local memory is to replace every load from local memory by a DMA from the global memory to the local memory, followed by load from local memory, and replace every store to the local memory by a store to the local memory followed by the DMA from the local memory to the global memory. While this solution can be easily automated, it is not very efficient as there are numerous small-sized (one word sized) DMAs between the local memory and the global memory. Instead, what is needed is a scheme that will result in few, even if large-sized DMAs between the memories. This is because, as the number of cores is scaled, memory bandwidth is expected to increase, but so is memory latency. Therefore, the performance penalty will be proportional to the number of DMAs, and not on the size of each DMA.

Management is needed for all code and data of a thread in LLM multi-core architectures, and researchers are developing solutions for them. This application focuses on stack data management. This is because about 64% of memory accesses in multimedia applications are to stack variables, and optimizing them is important for performance. Other researchers have proposed a promising approach for managing stack data using a Circular Stack Management (CSM) scheme. CSM essentially keeps the top few function frames in the local memory, and moves the older stack frames to the global memory. One attraction of the CSM is that it performs DMAs between the local memory and global memory in units of one or more function frames (coarse granularity), because of which it is quite efficient on the IBM Cell processor.

However, limitations have been identified in the existing approach that limit its applicability, and embodiments disclosed herein provide one or more of the following advantages.

First, unlimited stack data in the local memory is supported. Existing technique requires that the total amount of stack space required by the task must be known at compile-time, since the space for stack data in the global memory is pre-defined statically. Consequently, it does not support arbitrary depth of recursion without prohibitive task of profiling. This is improved by disclosing an interface by which a core can request for dynamic memory allocation in the global memory.

Second, book-keeping data structure for stack data management is finite and occupies a small portion of the local memory. Managing data between the local memory and the global memory requires a management table, which contains information about which data is present in the local memory, which have been relocated to the global memory, and where. Existing techniques assume that this table can be fully maintained in the local memory. However, the management table itself can exceed the local memory and this table can be managed between the local and the global memory.

Third, stack pointers pointing to other stack frames who are in the global memory currently will no longer become an issue. If in a function there is a reference to a local variable of a previous function, there can be a problem. Data management may have moved that stack frame which contains the variable to be accessed to the global memory, and therefore looking it up using the local memory address is impossible. This pointer problem can be addressed by always using global memory addresses for pointers to local variables, which eliminates all the assumptions.

Fourth, the number of DMA calls by stack data management is reduced, in order to decrease the memory latencies. Previous stack data management manages the stack data at the function granularity. Although it is intuitive, it does not take advantage of high bandwidth of interconnected bus network. The disclosed experimental results show that managing stack frames at a coarser granularity improve the performance by an average of 9%.

This application discloses a comprehensive scheme to manage stack data of a thread on the local memory of a core of LLM multi-core processors. After the disclosed inventive techniques, the task that executes on a core can use unlimited stack space, work with smaller local memory footprint, and allow access to local variables of other functions through pointers. In an embodiment, these are automated by providing a runtime library.

Only the local memory is accessible to the execution core and this small memory is shared by text code, stack data, global data and heap data of the thread executing on the execution core. All data should be present in the local memory when used. Therefore, only a fraction of the local memory is available for managing the stack data. Managing stack data is more challenging than code and global data, whose sizes are known at compile time. In contrast, stack data are dynamic in nature, i.e. function frames get allocated and de-allocated at runtime, as functions are called and returned. Furthermore, the total stack size requirement of a thread may not even be known statically, e.g. for recursive functions.

Figure 16:
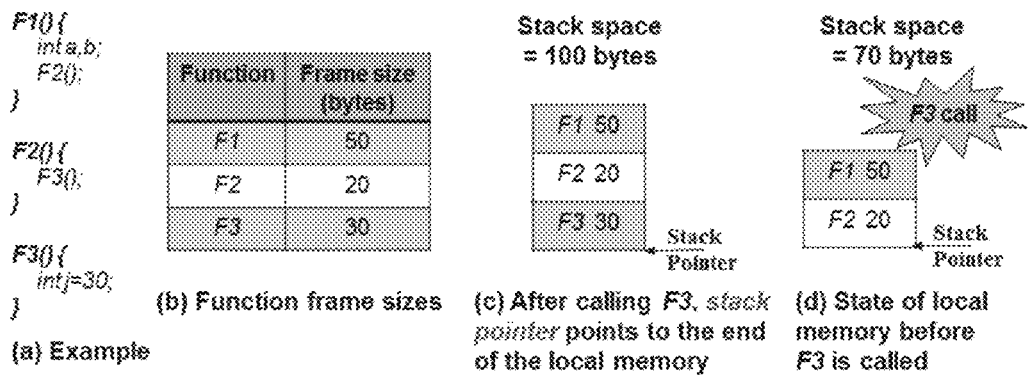
FIG. 16 illustrates an example of stack data management.

The need of stack data management in a fixed sized space in the local memory is illustrated by an example in FIG. 16. The example in FIG. 16($a$) has three functions, whose stack frame sizes are shown in FIG. 16($b$). FIG. 16($c$) shows that if 100 bytes are available to manage the stack data, there is no need to do anything. The application will work correctly and use up the entire space. However, if only 70 bytes are available to manage stack data, FIG. 16($d$) shows the state of the stack just before calling function F3. There is no more space in the local memory, and a space of 30 bytes must be created in the local memory for allocating the stack frame of function F3. Without management, stack data can grow and overwrite heap data or code, and cause application crash in the best case, or simply an incorrect output in the worst.

Local memories in Limited Local Memory (LLM) multi-core processors are raw memories that are completely under software control. They are very similar to the Scratch Pad Memories (SPMs) in embedded systems. Some researchers have noted that the majority of power in the processor was consumed by the cache hierarchy (more than 40% in StrongARM 1110). He demonstrated that this compiler controlled memory could result in performance improvement of 18% with a 34% reduction in die area. Consequently, SPMs are extensively used in embedded processors, e.g. the ARM architecture. Code and data can all be managed to use SPM, so that the application can be optimized in terms of performance and power efficiency. Techniques have been developed to manage code, global variables, stack data and heap data on SPMs.

Figure 17:
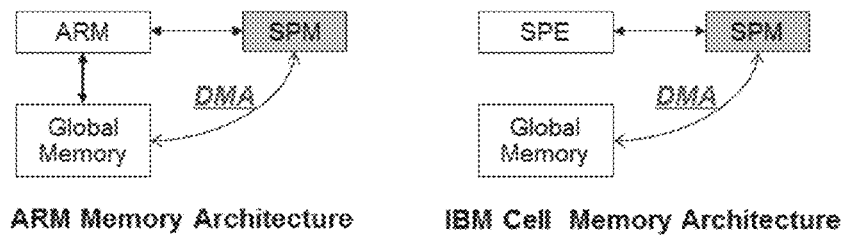
FIG. 17 illustrates memory architectures in embedded systems and in LLM multi-core architecture.

While all these works are related, they are not directly applicable for local memories in LLM multi-core architecture. This is because of the difference of the memory architecture of SPMs in embedded systems and in LLM multi-core architecture. FIG. 17 illustrates the major difference. It shows that embedded processors have SPMs in addition to the regular cache hierarchy. This implies that applications can execute on embedded processors without using the SPM. However, frequently needed data can be mapped to the SPM to improve performance and power, since it is faster and consumes less power. On the contrary, local memory is the only memory hierarchy of the core of a LLM multi-core processor. Consequently, using SPM is not an optimization problem, but is a necessity. The execution core can only access the local memory, and the data it needs must be brought into the local memory before it is accessed, or the application will not work correctly. In addition, the data access pattern when using SPM in the Cell processor needs to be considered, not just statically mapping the data.

The stack data management techniques proposed for embedded systems previously proposed only map some of the frequently accessed function frames to the SPM, and leave the rest to go through the cache hierarchy. Only the Circular Stack Management (CSM) scheme maps all stack data to the SPM, and will therefore work for LLM multi-core architectures. Three limitations of the CSM technique are identified and addressed to improve its applicability and generality. The next section reviews the CSM in detail and identifies three limitations.

Figure 18:
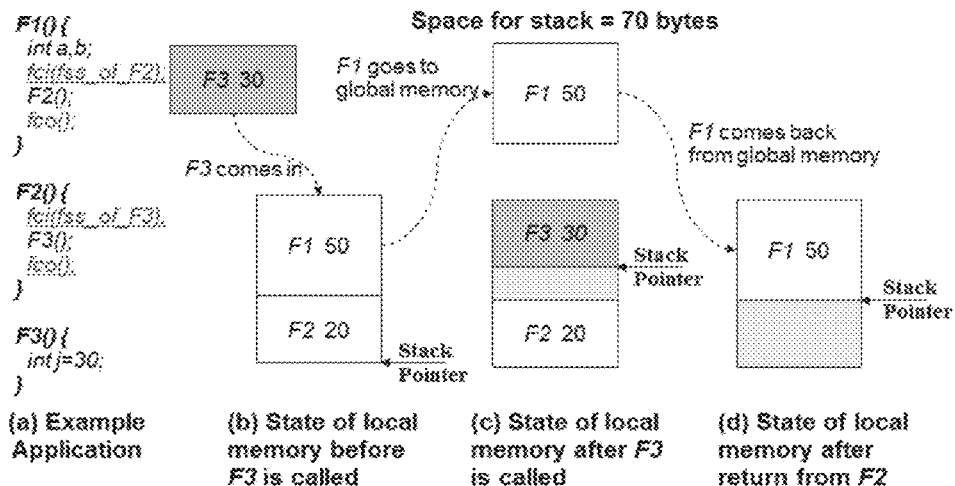
FIG. 18 illustrates the functioning of a circular stack management scheme.

The Circular Stack Management (CSM) scheme operates at the level of function frames. The basic technique is to export function frames to the global memory if there is no more space on the local memory. FIG. 18 illustrates the functioning of CSM. Consider the same application and function frame sizes as in FIG. 18, and the problem is to manage the stack data of the application in 70 bytes of space on local memory. FIG. 18(b) shows that the local memory is full after F1 call F2, there is no more space for stack frame of F3. To make space for F3, CSM evicts the frame of F1 to the global memory. This is shown in FIG. 18(c). After there is enough space for function frame of F3, it can execute. When F3 returns, the function frame of F2 is in the local memory, and therefore it can execute fine. However, after F2 returns, execution returns to F1, whose function frame must be brought back into the local memory. This is shown in FIG. 18(d).

The eviction and fetch of function frames are achieved by using stack management Application Programming Interface (API) functions _fci and _fco, that need to be inserted just before and after every function call. FIG. 18(a) shows these functions inserted in the original application in FIG. 18(a). The stack management API function _fci(fss) makes sure that there is enough space to accommodate the stack frame with the size f ss. If not, it evicts as many oldest functions as required to make enough space. Similarly, the API function _fco( ) makes sure the stack frame of the caller is in the local memory. If not, it is brought from the global memory. All this management requires a book-keeping data structure, that is referred to as Stack Management Table or SMT, which contains the information about whether function frames have been moved to the global memory, and their global memory addresses. The chief attraction of CSM is that it manages stack data at the granularity of function frames. The existing CSM approach has limitations, however, which will be discussed in the next section.

A. Limitations of Circular Management

1) Pointer Threat: CSM works efficiently for applications that do not have pointer references to any previous frames. However, if a function frame has a pointer reference to a variable in the evicted function frame, there is a problem. The problem is succinctly explained by constructing a simple program which is recursive in nature.

Figures 19, 20:
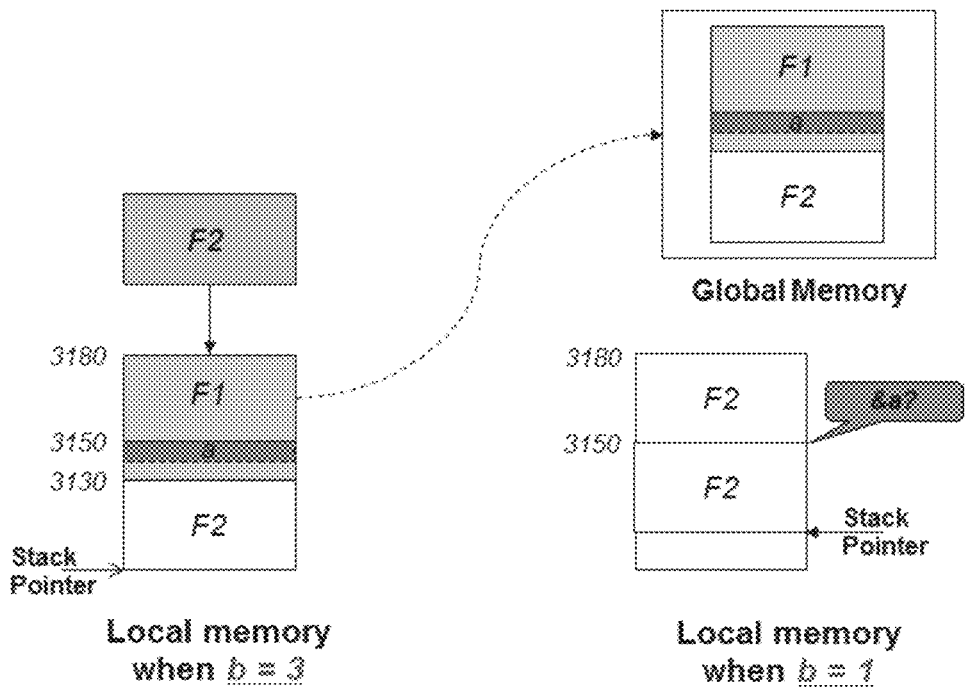
FIG. 19 illustrates an example application containing pointers to another function frame.
FIG. 20 illustrates an example of a pointer threat in the example application of FIG. 4.

As shown in FIG. 19, a is a local variable in function F1. F1 also declares a single-level pointer, ptr, which points to a. Now this ptr is passed as the second parameter to F2. The pointer to a in the third argument is passed as a two-level pointer reference. The function F2 is a recursive function. At the tail of the recursion, the local variable a is accessed through pointers inside F2. This example uses the common programming practice of using pointers to local variables and reading/writing to them in other functions. Essentially, the function stack for the active function accesses data in other stack frames in its call path. The stack frame sizes of the functions in the example application are shown in Table 9.

TABLE 9

Stack frame sizes for the example pointer application

| Function | Function Frame Size (Bytes) |
|---|---|
| F1 | 50 |
| F2 | 30 |

Let us assume the SPM size be 80 bytes. Now consider executing this application with b=3. The total stack space required for this application will be 50+30×3=140 bytes, which is larger than the available stack space. Therefore stack management is needed. CSM will be used to manage stack frames in the local and global memories. When F1 is called, its function frame is created in the stack, with a location for a. FIG. 20 illustrates the pointer threat of the example application in FIG. 15. Suppose the frame of function F1 starts at address 0x3180, and space is allocated for a at 0x3150. Then after the assignment, ptr contains the value 0x3150, which is the address of a in the local memory. Now all goes fine until the first call to F2. At this point, the function frames of both functions F1 and F2 are in the stack. Now when F2 (with b=3) calls another instance of F2 (with b=2), the CSM function _fci will remove F1 out of the local memory, and relocate it to the global memory. When the execution calls the third instance of F2 (b=1), it falls into the base case, where a is accessed.

They all access the contents of local memory address 0x3150. This is clearly wrong, since the variable a of function F1 is actually in global memory, and not in the local memory. If the program returns to F1, then the original value of a will be loaded—however, this is the lesser problem. This assignment will corrupt the stack frames of previous invocations of F2, and can lead to failures and crashes.

The challenge here is that, the kind of code illustrated in FIG. 4 is all too common, and is not even considered bad programming, and this pointer problem will show up in any data management solution, and is not specific to CSM. One solution is to advise programmers to "use pointers at their own risk". However, to avoid curbing programmer's productivity and creativity, the pointer addresses need to be resolved, and this is not trivial. The problem is that threads are written (and should be written), assuming infinite local memory. Therefore, pointer to a variable will contain local address of the variable. If that variable is relocated to the global memory, then two things are needed to resolve the pointer correctly: First is to know that the variable has been moved out, and this is relatively easy, and can be implemented using a management table, but the second problem is to find its global address. This is not easy, a local address is being used to try to find a global address, but the relation from local address to global address is a "one-to-many" relationship. The same local address may map to several global addresses. Since local memory is limited, over time several variables will be mapped to the same local memory address, but as they are relocated to the global memory, they will have different addresses there. In summary, although other techniques have been proposed to solve the pointer issue to some extent, a more comprehensive solution is required. Note that one way to solve the pointer problem is to just increase the size of local memory used to manage stack data, but then the challenge is to find how much stack space is needed. In extremely embedded contexts, the pointer safe local memory size for a given program inputs may be empirically determined by repeated simulation with several stack space allocations, and observing when execution fails or starts giving wrong results. In not-so-embedded setting, it is difficult to statically determine the maximum stack space needed because the call graph of an application may not be statically determinable, e.g. in the presence of function pointers and recursion. The inventive concepts disclosed in this application allow programmers to arbitrarily use pointers to stack variables, seamlessly integrate recursion, and support function pointers.

2) Memory Overflow: There are two aspects of memory overflow in conventional approaches. One is the overflow of the memory space in the global memory, and the second is the overflow of the Stack Management Table, or SMT.

CSM allocates a large space at the start of the program in the global memory to accommodate all the stack data of the execution cores. If enough space is allocated, then this management can be performed very efficiently, by just maintaining a pointer to the start of free space in the global memory. The execution core can then just perform a DMA of function frames to the global memory. Further, since the execution core knows the size of function frames, it can update the pointer to free space by itself. Again, this scheme will work in extremely embedded contexts, where the maximum stack space require by application can be known, but is impossible in general due to recursive functions. For recursive functions, the stack space required may be unbounded. In other words, no amount of initial memory allocation in the global memory may be enough. As a result, when the pre-allocated global memory is filled up, any further DMAs can write into the address space of other execution cores, causing an access fault in the best case, and wrong results in the worst. In such a case, there are three choices. One is to disallow recursion, the second is to leave it to programmers, and the third is to develop a scheme to support unbounded recursion.

The other memory overflow problem in the CSM is that of the overflow of book-keeping data structure for the stack data management, Stack Management Table (SMT). Every time the stack management function _fci is called, it creates a new entry in SMT, which contains information like function id, where it is present, its address in global memory, and size. When a function returns, its entry can be deleted from SMT. CSM maintains SMT on the local memory. For unbounded recursion, this table can grow arbitrarily large, and any amount of space on local memory will not be sufficient. Just like stack frames, the SMT itself should be managed—without creating any more dynamic data structures in the local memory.

B. Enhancement Of Circular Management

Figure 21:
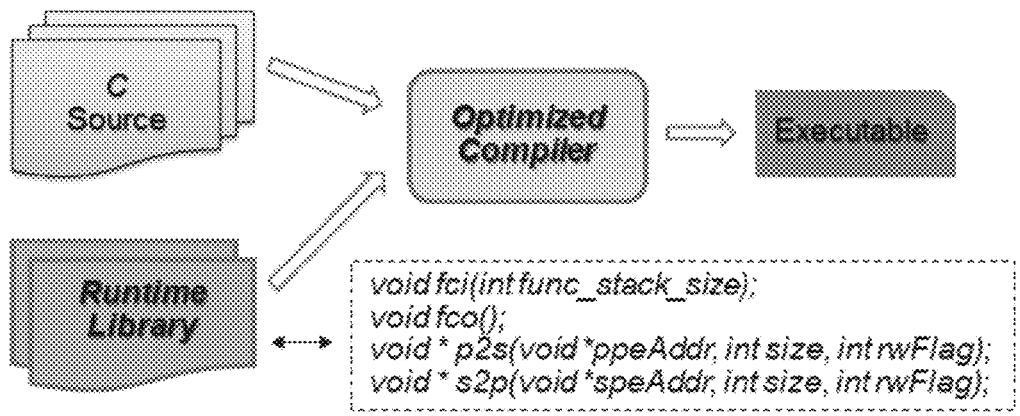
FIG. 21 illustrates an overview of runtime and compiler framework for stack data management.

An embodiment of the disclosed stack data management techniques comprises a runtime library and modified compiler. FIG. 21 illustrates this management flow. The rectangles containing italic bold words are modules which could and should be embedded in the compilation of C code. Arrows connecting components represent the flow of the component dependencies. The runtime library has four stack management library API functions, _fci, _fco, p2s and s2p. The key functionalities of the management functions can be summarized as follows.

1) Check for available stack space in the local memory of LLM multi-core architectures before a function call.

2) Dynamically allocate more space in the global memory if the space for stack data there is not sufficient enough.

3) Evict book-keeping data structures to the global memory if the pre-defined space for management table is used up.

4) Maintain the exact address mapping of all stack frames residing in local memories and global memory.

5) Transfer stack frames between the global memory and the local memory.

6) Access the right pointed-to stack data.

_fci and _fco will be inserted right before and after each function call, including real function calls and function pointers. On the contrary, p2s and s2p will be inserted around each stack data reference. For purposes of this application, only pointers to stack data and function pointers are discussed. All other pointers in the application, i.e. pointers to heap data and pointers to global data, are not discussed since CSM never touches those data.

1. Pointer Resolution

Figure 22:
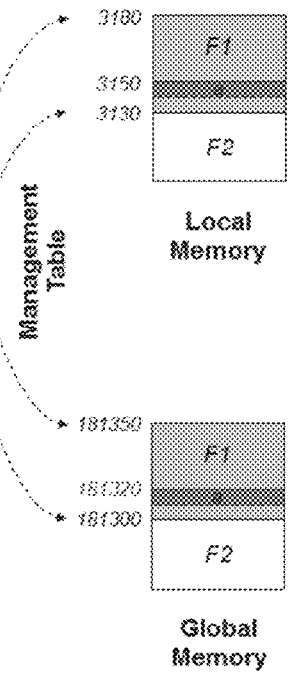
FIG. 22 illustrates the mechanism of the disclosed pointer approach.
Figure 23:
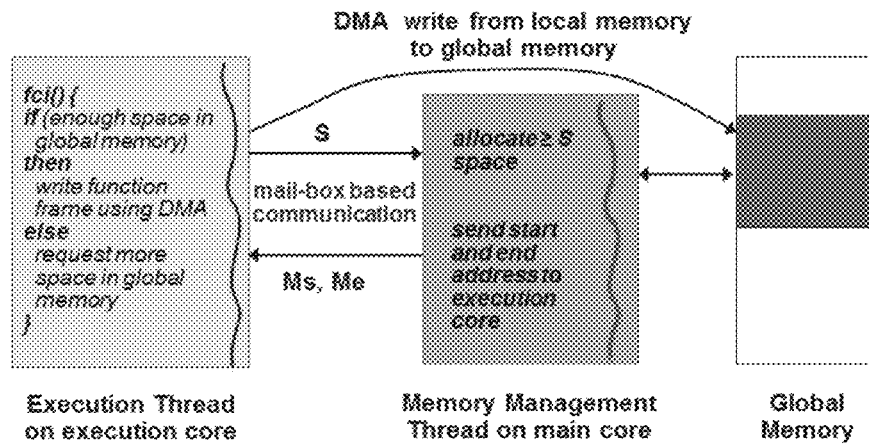
FIG. 23 illustrates the process of managing a memory request.

An important point in pointer resolution is that, it is not possible to resolve a pointer using local address. Thus, whenever a pointer is set, it must be set to a global address, rather than a local address. FIG. 22, illustrates the mechanism of the disclosed pointer resolution approach. The addressing mechanism whenever a pointer to a stack variable is used needs to be changed. FIG. 22(*a*) shows two kinds of modifications in the application program that was shown in FIG. 19.

The first kind of change is that the initialization of the pointer ptr is changed to s2p(&a, −1, −1) and p ptr is changed to s2p(&ptr, −1, −1). The function s2p converts the local address of a variable into the global address by first finding which function stack frame the pointer belongs to (in this example, F 1). Then it computes the offset of the pointer variable (in this example, only &a is picked to show the disclosed pointer management) as the relative displacement from the start address of the frame (F 1) in the local memory to the local pointer address. Finally, it returns a global address, which can be calculated by first getting the global start address of this function frame (F 1) that is stored by _fci function before F 1 is called and then subtracting the displacement. FIG. 7 shows that the stack top is at the local address 0x3180, which is stored in the Stack Management Table, or SMT. When ptr is initialized, it will get the global address of the variable by the help of s2p function. This is done by firstly computing the local address 0x3150 for a. Then the offset is computed as 0x3180−0x3150=0x30. The start global address of the function frame of F 1 is looked up from the SMT, and is 0x181350. Using these, the global address of the variable a can be computed as 0x181320.

The second kind of change is that p2s and s2p are inserted automatically right before and after each reference. p2s works directly with a global address and returns with a local address. On the contrary, s2p translates a local address back to the global address belonging to this pointer. If the stack data pointed by the pointer is not in the local memory, access to global memory through DMA calls are needed. If the statement contains a write operation, s2p is responsible for updating the content in that global address. If it is a read operation, p2s needs to firstly fetch the value by explicit DMA call to a buffer, and then returns its local address. When some other pointers are read/write, this buffer will be overwritten. For example, the content pointed by p ptr is modified to the value 1. s2p function will update it directly in the global memory, besides translating the local address back to the global address. By performing this direct global memory transaction, any data coherency problems are avoided.

One thing deserves to be mentioned is that, the disclosed compiler can process multi-level pointers in the application, utilizing the existing functionalities provided by gcc: i) The operations containing multi-level pointers in C are broke down to operations containing only single-level pointers in GIMPLE Intermediate Representation (IR), with artificial pointers generated by the compiler. An example of transformation from C to GIMPLE IR is shown in FIG. 7(*a*), where p ptr is a pointer-to-pointer in C. In the example, a pointer write statement is transformed to two statements in GIMPLE IR, with an artificial pointer D.3512 generated by compiler. ii) The symbol table contains abundant information about every operand in any statement. The type of each operand is differentiated, and p2s and s2p are inserted only around memory references. For example, no management functions are placed around the statement "D.3512=*p ptr;". It's because they both are recognized by compiler as var decl type in this statement.

2. Dynamic Management of Global Memory

The stack data in the global memory must be managed dynamically for the general case. This implies that at some time, the execution core must request the main core to allocate more memory. Since this cannot be done by a DMA call, and therefore some other communication mechanism between the execution core and the main core must be used. In the Cell processor, the mailbox facility is used for this purpose. Additionally, a new thread is implemented on the main core that will continuously listen to requests from the execution core, and allocate memory when requested. Then it sends the start addresses of the allocated space to the execution core. This is done so that in most cases, the address translation can be done in the execution core, and only a direct DMA will be needed.

On the execution core, this functionality is implemented in the _fci function. It first checks if there is space for the incoming function stack on the local memory. If not, the oldest function frames should be evicted to the global memory. FIG. 8 shows the whole process needed to manage a memory request. Before eviction, _fci checks whether more memory is needed in the global memory. The remaining space in the global memory is tracked by variables Ms and Me in the execution core. If not, it sends a request via the mailbox to the main core. The memory management thread on the main core accepts this request, allocates more memory (e.g. two times) than the request, and finally sends the start and end address of the newly allocated memory to the execution core, which can then be used for further stack management. The reason to allocate more memory is that it can reduce the number of communication calls without allocating memory each time function stack frame evicted. The functionality of _fco is very similar, except that if all the functions from a memory region have been brought back to the local memory, the memory is freed.

Instead of adding the global memory management functionality in the existing thread of the main core, keeping this as a separate thread has several advantages. One is that the code of the main thread does not need to be modified, and the extra threads can be supplied as a part of the library, and the user just needs to compile their application with it. Finally, this separate thread solution scales with the number of cores, as just one thread will be able to manage the memory requirements of all the execution threads on the processor. Since the memory allocation is managed by the operating system on the main core, the dynamically allocated buffers never infringe each other's space.

3. Management of Stack Management Table

Stack Management Table (SMT) is important for this dynamic management of stack data. SMT is needed every time a function frame is evicted/fetched from/to the local memory. It helps in finding out the global address for a local address and keeping track of the space left in the global memory. However, SMT itself occupies space in the local memory, and enabling unlimited stack depth also requires managing its contents. In other words, some part of the SMT must be evicted to the global memory to make space for new entries.

Dynamic management of SMT is achieved by setting an initial fixed size of the SMT and monitoring if it gets filled. When _fci adds a new entry in the SMT for the coming function and the SMT is full, the entire SMT is exported and its entry pointer is reset to the start entry of the SMT. When _fco accesses the already empty table, one table-full entries are fetched back to the local memory, and the table pointer is set to the end entry of the table. Note that after this scheme of dynamic management of SMT, all management is done in constant-sized space. The memory requirements in global memory however are still dynamic, and is managed through the use of the memory management thread on the main core—just like data management of function stack frames.

4. Experimental Results

Experimental results demonstrate an average improvement in stack data management performance of about 9%.

The need for and effectiveness of the disclosed approach was demonstrated by experiments on the Sony Playstation 3 with Linux Fedora 9. It gives access to 6 of the 8 Synergistic Processing Elements (SPEs). The disclosed approach was implemented as a library with the GCC 4.3.2. Benchmarks from the MiBench suite were compiled and rund. These benchmarks are not typically multi-threaded; so all the input and output functionality of the benchmark were kept in the main thread on Power Processing Element (PPE) to make them multi-threaded. The core functionality of the benchmark is executed on the SPE. Thus, each benchmark has two threads: one running on the PPE and the other on SPE. In an experiment on scaling, multiple threads of the same functionality were run on the SPEs. The runtime for PPE was counted by mftb( ) and the runtime for SPE was counted by spu decrementer( ) which are provided as the library with IBM Cell SDK 3.1.

Figure 24:
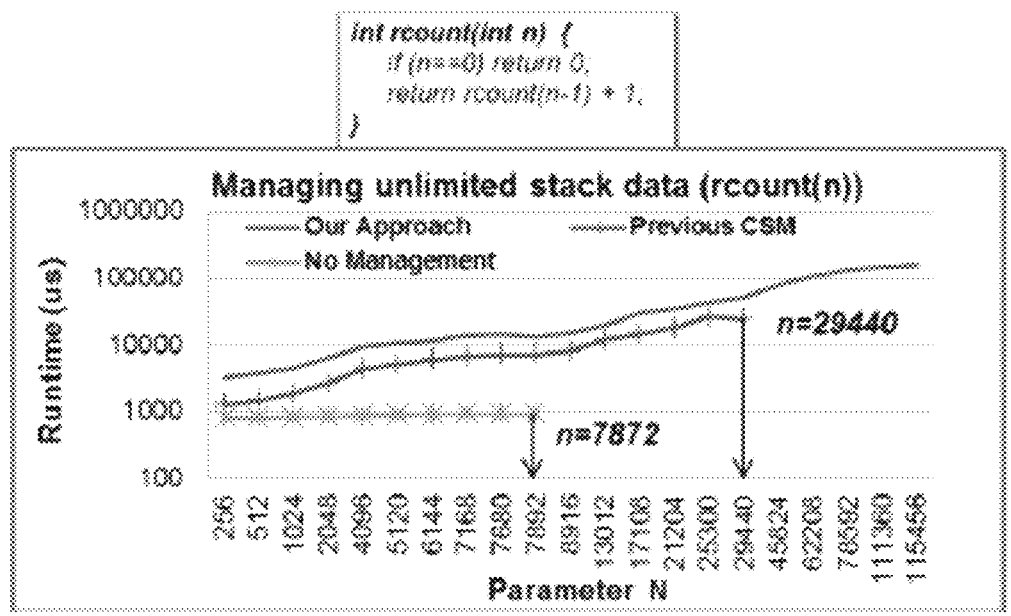
FIG. 24 illustrates runtime in a recursive function.

To demonstrate the need of the disclosed technique a simple recursive function rcount was executed, and plot the runtimes in FIG. 24. This simple application requires 8480 bytes for the code and 496 bytes for global data, and the rest 246 KB can be used for stack. The function stack frame size of this application is 32 bytes, and therefore, without stack management, this application only works for n<7872.

FIG. 24 shows that when the previous approach of stack management is applied, the recursive function only works for n<29440. This is because the previous technique set the stack region size as 16 KB. Therefore, the rest 230 KB can be used for stack management table. However, as n increases, the space in the local memory used by the stack management table also increases, and therefore all the rest space is used up for storing management table entries. There is a leap when n>512 for two CSMs. This happens because the 16 KB for stack data have been filled up and the eviction is needed for new stack data.

Figure 25A:
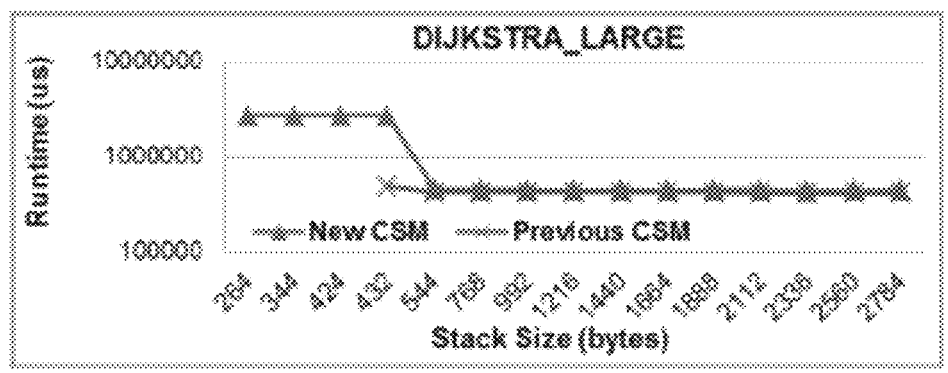
FIGS. 25(a) and 25(b) compare memory requirements for the disclosed memory management technique.
Figure 25B:
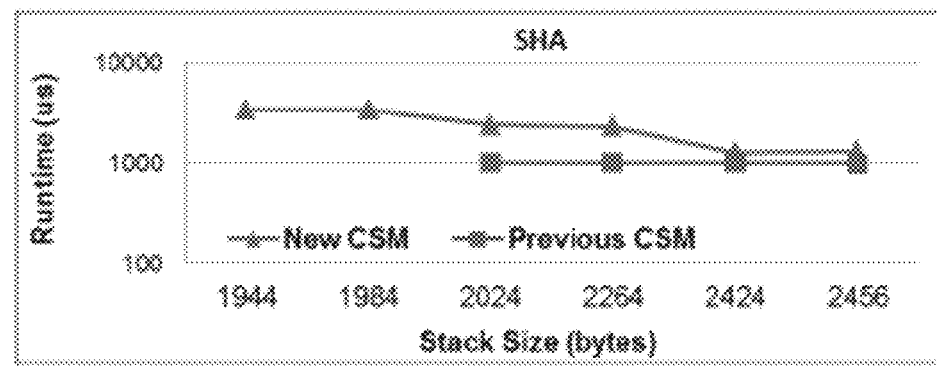

One notable observation from FIG. 25 is that the disclosed technique has no limitation on the stack depth that it can support. As compared to the previous technique, the size of the stack management table and the memory allocation in the global memory does not impose restrictions. When the number of entries in the table exceeds the mentioned fixed size, it is exported dynamically to the global memory. Also the disclosed scheme does not need array size on the global memory to accommodate stack frames. This is taken care of automatically by the Global Memory Management Thread in the PPE.

The disclosed technique promises to run any application in the least amount of stack on the Limited Local Memory architectures. Given a benchmark, the size of the largest stack frame and the maximum stack depth are found by profiling. These benchmarks are run using space on local memory equal to the size of the largest function frame plus the maximum size of stack management table. This minimum stack size is shown in the second column of Table 10.

TABLE 10

BasicMath and SHA cannot run with the minimum stack size without the disclosed pointer management, but can run with a larger stack size after many fails of simulations.

| | Previous CSM | | New CSM | | | |
|---|---|---|---|---|---|---|
| Benchmark | Stack Sz (bytes) | Runtime (us) | Stack Sz (bytes) | Runtime (us) | Stack Sz (bytes) | Runtime (us) |
| BasicMath | 168 | CRASHES | 218 | 1575747 | 168 | 1582033 |
| SHA | 1944 | CRASHES | 2024 | 1084 | 1944 | 1104 |

Table 10 also show the runtime of the application, if it fails, CRASHES is printed. It can be noted that benchmarks BasicMath and SHA crash. The disclosed stack management can work with less space on the local memory. The sixth column lists the minimum space on the local memory required by the disclosed scheme, and the seventh column lists the time required to execute the application with this size. The main observation is that the disclosed technique successfully resolves the pointer problem, and therefore works for a wide range of benchmarks.

The disclosed technique can manage stack data in a smaller space on the local memory. The minimum space that the previous approach requires on the local memory is the sum of the largest function stack size and the size of the stack management table (SMT). The SMT contains one entry for each function instantiation. The SMT is dynamically managed between the local memory and the global memory, and therefore can work with just one entry. As a result the disclosed technique occupies much less space on the local memory.

Figure 26:
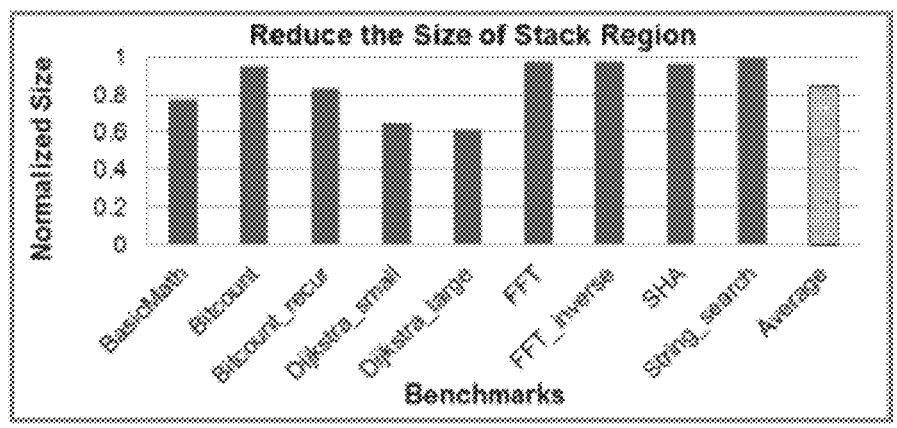
FIG. 26 compares the minimum stack size of conventional techniques and the disclosed technique.

FIG. 26 shows the comparison between the minimum stack size used by previous work and that used by the disclosed approach. The minimum stack size is the size for both stack data and management table. Obviously, the disclosed approach uses less space on the local memory. The difference will be much more significant if the application has a larger function call depth. Using less space on the local memory is extremely crucial, since the local memory is typically small, and on top of that, it is shared by global data, stack data, heap data and the application code. In order to maximize the flexibility of mapping, it is vital to be able to map each individual data in as little space as possible.

Figure 27:
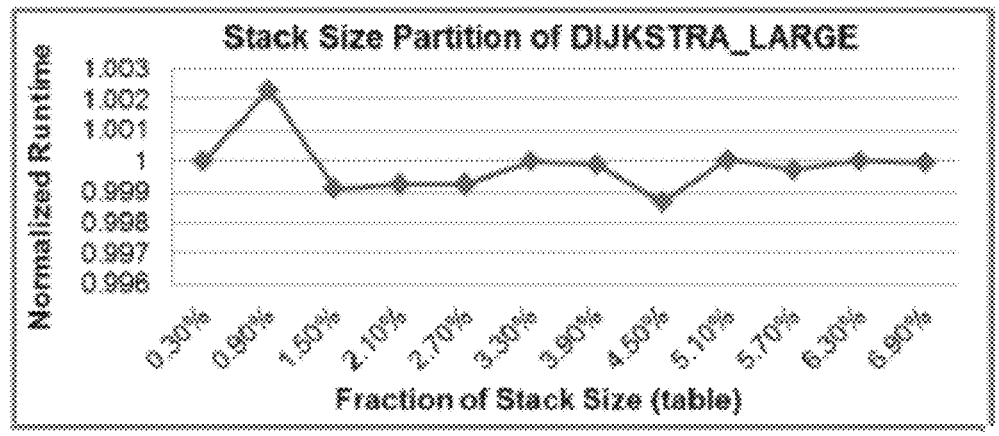
FIG. 27 illustrates the interaction between stack frames and the Stack Management Table.

While all benchmarks in MiBench are managed in a smaller space, only sha and Dijkstra are shown in FIG. 27 for clarity and conciseness. The graph shows the previous technique does not work until the space allocated for stack data of sha on the local memory is 2024 bytes, while the disclosed technique starts working with only 1944 bytes of space. Similarly, the disclosed technique can bring down the minimum space on local memory required to perform stack management from 432 bytes to 264 bytes for Dijkstra. In both cases, the runtime for the previous and disclosed technique are comparable for the same stack size. The reason for this is that although the disclosed technique is more generic and incurs more management overhead, the space in the local memory used for SMT can be reduced, and the number of function frames that can be kept on the local memory can be increased. This results in less DMA between the local memory and the global memory, and also less communication between the PPE thread and the SPE thread. The interaction between stack frames and the stack management table will be shown in the next section.

Figure 28:
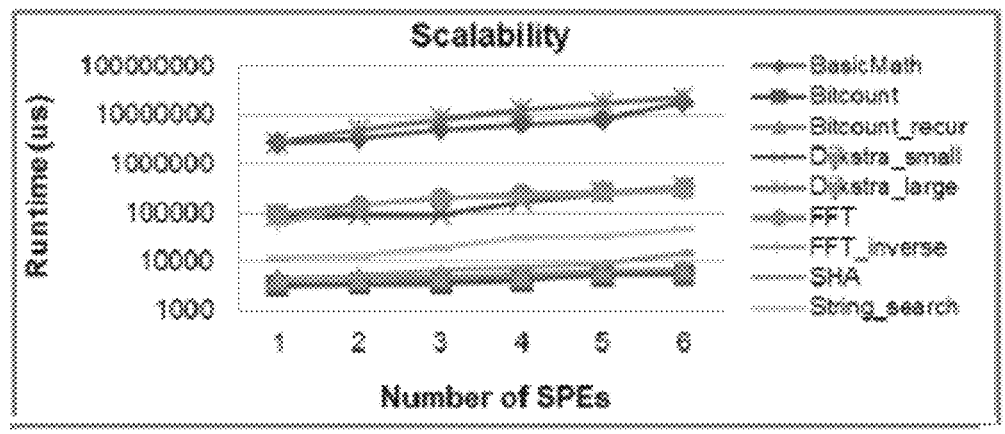
FIG. 28 illustrates the increase in memory traffic as the number of cores increase.

As both stack data and Stack Management Table (SMT) are managed between the global memory and the local memory, there are interactions between the stack frames and SMT. Given a constant size for them, programmers need to distribute this size between them. As they are not directly correlated, it is hard to make the partition decision at the runtime. In order to get the optimal partition of stack region in the local memory, users usually need to simulate the executions of the application, and then reach the optimal partition. In this section, the interaction with each other is shown to give a basic idea for further optimization. Since the application with large stack depth could have more points, benchmark Dijkstra large is selected. It is a recursive application, and has the largest stack depth among all benchmarks. The total stack size is set to be 2616 bytes. As shown in FIG. 28, the curve is almost flat. When changing the partition between the stack frames and SMT, there seems trivial impact on the performance. This result scales with other benchmarks, and indicates that there are very little space for further optimization.

Lots of factors that can affect the application performance, e.g. stack size defined in the local memory for stack frames, the size dynamically be allocated in the global memory each time. The overheads of the disclosed CSM is checked at two extreme configurations with different stack size defined in the local memory: i) maximum stack size—given the same amount of space for stack data as the benchmark needs, and therefore no DMA data transfers between global memory and local memory; ii) minimum stack size—maximum function stack frame size plus the size for one entry in the SMT. Another thing should be noted is that stack pointer management is performed in the conservative way—using s2p to transform all stack pointers from the local address to global address, and placing p2s and s2p around them to operate on them. This is because it is hard to analyze whether the stack pointer points to other stack frames. The overheads of stack management, which are measured by spu decrementer, are shown in Table 11.

TABLE 11

Overhead for two stack sizes.

| | Maximum Stack Size | | | Minimum Stack Size | | |
|---|---|---|---|---|---|---|
| Benchmark | _fci (%) | _fco (%) | p2s, s2p (%) | _fci (%) | _fco (%) | p2s, s2p (%) |
| BasicMath | 9.13 | 0.08 | 0.02 | 10.91 | 0.09 | 0.02 |
| Bitcount | 2.75 | 0.01 | 0 | 3.53 | 0.02 | 0 |
| Bitcount_recur | 2.23 | 0.00 | 0 | 6.00 | 0.05 | 0 |
| Dijkstra_large | 0.24 | 0.19 | 0 | 19.58 | 0.31 | 0 |
| Dijkstra_small | 0.24 | 0.19 | 0 | 18.24 | 0.30 | 0 |
| FFT | 0.15 | 0.11 | 0 | 0.18 | 0.12 | 0 |
| FFT_inverse | 0.13 | 0.10 | 0 | 0.19 | 0.12 | 0 |
| SHA | 2.11 | 0.05 | 0.02 | 7.06 | 0.13 | 0.04 |
| String_search | 11.26 | 0.04 | 0 | 13.21 | 0.06 | 0 |

When the stack management is configured to use as much space as each benchmark wants, the average overhead is only 3.23%. In another aspect, if stack data is managed with the minimum stack size, the overhead of _fci accounts for a large portion of the total runtime. This is because space on the global memory would be dynamically allocated when the eviction happens. As only a very small space is allocated each time, there are large number of times of memory allocation, requiring mailbox communication with the global memory. If larger space is allocated, this can be reduced.

Till now all experiments were on PPE and one SPE. The disclosed approach adds a memory management thread to the PPE that would service the memory requests from all the cores. To illustrate the scalability of the disclosed approach, identical benchmark were executed on every core. The benchmarks were run at the least stack and table size. This ensures that maximum transfers of stack management table and stack frames to the global memory were done. FIG. 28 plots the runtimes (as measured on the PPE), of the benchmarks as the number of cores/threads scale. In the case of Bitcount, the memory traffic is less as there is no recursion and it gives nearly similar runtime as the number of SPEs is scaled. However, the runtime gradually increases for other benchmarks. This is because, as the number of thread/cores increase, the number of memory requests increase. Besides, they block the SPEs until the previous requests are served. Another important observation is that as the number of cores/threads is scaled, at some point (which varies for each application), the runtime suddenly increases. This is because, as the number of threads/cores increase there is a larger memory traffic and this causes the overload of the memory bus.

Figure 29:
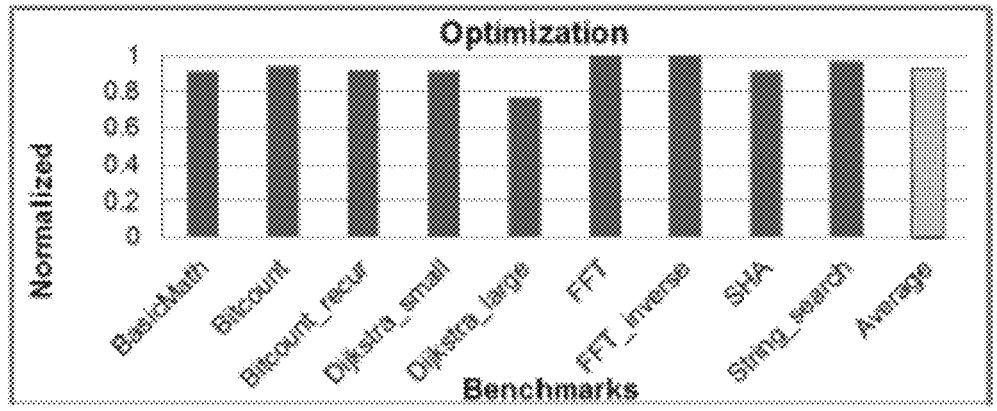
FIG. 29 shows the average improvement for all benchmarks with different stack sizes and different management granularities.

When the number of cores keeps increasing, the bandwidth of interconnect network is expected to increase, but so is memory latency. Therefore, the stack data management overhead will be proportional to the number of DMAs incurred by transferring stack frames and table entries between the global memory and the local memories. When managing the stack data at the granularity of function frames, there can be many small-sized DMA transfers. For example, if the local memory contains 10 function frames with stack size 36 bytes before a function with 360 bytes stack data is issued, 10 times of DMA call will happen. Each time function _fci( ) checks whether the eviction of function frames is enough, till all 10 frames are put to the global memory. When the function with large stack data returns, there will be another 10 times of DMAs, each time the caller's stack frame will be fetched. This is definitely inefficient. What is expected is a coarser management granularity if possible. The optimization of stack data management is to utilize the high bandwidth of network. When an eviction is needed, _fci( ) function counts all frames that need to be evicted, and evicts them once. Similarly, when _fco( ) needs to get stack frames back to the local memory, a whole stack region will be fetched. As a result, the number of DMAs is reduced and therefore the management penalty is lessened. FIG. 29 shows the average improvement for all benchmarks with different stack sizes and different management granularities. As can be seen, the average improvement is around 9%.

A novel technique for stack memory management for limited local memory multi-cores, with function libraries _fci, _fco, p2s, and s2p, is disclosed. The disclosed implementation takes into account the space management on the global memory and allocates eviction-aware memory, thus conserving and benefiting other memory hungry applications running on the global memory. The disclosed stack management technique is not confined to limited local memory multi-core architectures but can also be used in general purpose systems.

The disclosed work foresees further possibilities of research inefficient management of stack. The work can be done in three major areas. First, the global memory management thread can be made to allocate space intelligently, predicting recursion to reduce the number of allocation requests. Secondly, a heuristic can be proposed to estimate a better partition between the stack management table space and frame space to optimize the number of DMA transfers caused due to table and function frame eviction. If so, exhaustive and prohibitive task of profiling can be eliminated. Finally, one optimization on stack data management by taking advantage of the large bandwidth is shown. However, optimization can be directly conducted on managing the stack data at the granularity of function frames. By analyzing the call graph, some DMA can be overlapped with computations if it is known that some frames will be evicted or fetched.

As future architectures are likely to have distributed cores with limited local memory, scaling general purpose applications becomes a challenge. The ultimate quest is to increase the performance/watt. If an application can be run in smaller memory requirement, it eventually means that the memory per core can be reduced freeing up space on the die which can be used for other purposes like embedding more cores per chip which can increase the throughput.

The invention claimed is:

1. A computer-implemented method to compile software into executable code for execution on a processor having an associated local memory for storing stack frames and a global memory, the method comprising:
generating a weighted call graph of said software;
determining locations to add said stack store (_sstore) for copying all stack frames from local memory to global memory to create a stored stack state and stack load (_sload) instructions for copying the stored stack state from global memory to local memory using the weighted call graph;
adding calls to stack store instructions (_sstore) to said software at said locations; adding calls to stack load instructions (_sload) to said software at said locations; and compiling said software into executable code.

2. The computer-implemented method of claim 1, wherein an optimal cutting of the weighted call graph contains a set of cuts that forms a set of segments, where each segment satisfies a memory weight constraint and a total cost of the segments is minimal.

3. The computer-implemented method of claim 1, wherein said step of determining locations is performed in accordance with a smart stack data management (SSDM) heuristic.

4. The computer-implemented method of claim 3, wherein said SSDM heuristic comprises:

| Algorithm 1: SSDM(WCG(V,E)) |
|---|
| 1  place cuts on recursive edges, if there are recursive funcs. |
| 2  define vector $\mathcal{C}$, in which $x_{ij}$ indicates if a cut should be placed on edge $e_{ij}(e_{ij} \in E \setminus E_{recursive})$. set all $x_{ij} = 1$. |
| 3  while 1 do |
| 4      define vector $\mathcal{B}$ to store removing benefit of each cut. |
| 5      foreach $x_{ij} == 1$ do |
| 6         set boolean violate to false, it shows if removing this cut would violate the weight constraint. |
| 7         Define total cost $Cost_{before} = 0$. |
| 8         foreach segment s_old$_i$ that are associated with $x_{ij}$ do |
| 9            calculate cost cost_old$_i$ with Equation 2-5. |
| 10           $Cost_{before}$ + cost_old$_i$ |
| 11        assume the cut of $x_{ij}$ is removed, and get a new set of associated segments. |
| 12        Define total cost $Cost_{after} = 0$. |
| 13        foreach new associated segment s_new$_i$ do |
| 14           check weight constraint with Equation 1. |
| 15           if weight constraint is violated then |
| 16              violate = true |
| 17              break |
| 18           calculate cost cost_new$_i$ with Equation 2-5. |
| 19           $Cost_{after}$ + cost_new$_i$ |
| 20        if violate then |
| 21           continue |
| 22        calculate benefit of removing the cut $B_{ij} = Cost_{before} - Cost_{after}$ |
| 23        if $B_{ij} > 0$ then |
| 24           store $B_{ij}$ into vector $\mathcal{B}$. |
| 25     if $\mathcal{B}$ contains no element then |
| 26        break |
| 27     find out the largest benefit value $B_{max}$ from $\mathcal{B}$, and set the corresponding cut $x_{max} = 0$. |

5. The computer implemented method of claim 1, further comprising
analyzing said software to determine where to add calls to pointer stack management functions; and
adding calls to said pointer stack management functions.

6. The computer implemented method of claim 5, wherein said step of analyzing software comprises collecting must-alias set and may-alias set for each stack pointer p.

7. The computer implemented method of claim 6, further comprising
calculating stack sizes of functions between stack pointer p and all of its aliases; and
adding calls to instructions for managing the stack pointer p if it is larger than the size of the stack space.

8. The computer-implemented method of claim 1, wherein said stack store (_sstore) and stack load (_sload) functions are implemented in a runtime library.

9. A method of managing stack space in a local memory of a processor which is associated with a global memory, comprising:
instantiating stack frames in the stack space until a management point, the stack frames forming a stack state;
calling a stack store function (_sstore) for copying the stack state to the global memory at the management point, wherein the stack store function (_sstore) is called from a location determined by using a weighted call graph; and
calling a stack load function (_sload) for copying the stack state from global memory to return the stack state to local memory, wherein the stack load function (_sload) is called from a location determined by using a weighted call graph.

10. A computer-implemented method to compile software into executable code for execution on a processor having an associated local memory for storing stack frames and a global memory, said method comprising:
generating a weighted call graph of said software;
determining locations to add stack store (_sstore) and stack load (_sload) instructions using the weighted call graph, wherein said stack store instructions (_sstore) copies all stack frames from local memory to global memory to create a stored stack state to said software and said stack load instructions (_sload) copies the stored stack state from global memory to local memory to said software;
adding calls to stack management functions _fci and _fco before and after each function call, wherein said function _fci checks for available stack space in the local memory, evicts stack frames to global memory if insufficient stack space is available, and requests an allocation of more space in the global memory if necessary, and said function _fco retrieves stack frames from global memory to local memory;
adding calls to pointer resolution functions p2s and s2p functions before and after each stack data reference, wherein said functions p2s and s2p maintain an exact address mapping of all stack frames residing in local memories and global memory and translate local addresses to global addresses and vice versa; and
compiling said software into executable code.

11. The computer-implemented method of claim 10, further comprising implementing a stack management table (SMT), said SMT comprising a book-keeping data structure for stack data management.

12. The computer-implemented method of claim 11, wherein said stack management table is dynamically managed by setting an initial fixed size and exporting the table if it gets filled.

13. The computer-implemented method of claim 10, wherein said function s2p converts the local address of a variable into a global address by computing an offset of the variable using a stack start address in the local memory and uses the offset to move relatively in the global memory to reach the pointer location.

14. The computer-implemented method of claim 10, wherein said executable code implements a thread on a main core to listen to requests for allocation of memory.

15. The computer-implemented method of claim 12, wherein more memory is allocated than requested amount of memory.

16. The computer implemented method of claim 10, wherein said functions _fci, _fco, p2s and s2p are implemented in a run time library.

* * * * *

UNITED STATES PATENT AND TRADEMARK OFFICE
CERTIFICATE OF CORRECTION

PATENT NO. : 9,015,689 B2  
APPLICATION NO. : 14/200477  
DATED : April 21, 2015  
INVENTOR(S) : Ke Bai, Aviral Shrivastava and Jing Lu Page 1 of 1

It is certified that error appears in the above-identified patent and that said Letters Patent is hereby corrected as shown below:

On the title page, Item (73) Assignee, line 1:

Please delete "Board of Regents on Behalf of Arizona State University," and replace with -- Arizona Board of Regents on Behalf of Arizona State University --.

Signed and Sealed this
Twenty-ninth Day of September, 2015

Michelle K. Lee
*Director of the United States Patent and Trademark Office*